(12) United States Patent
Kojima

(10) Patent No.: US 8,977,433 B2
(45) Date of Patent: Mar. 10, 2015

(54) ELECTRIC POWER STEERING APPARATUS

(75) Inventor: Atsushi Kojima, Takasaki (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/202,917

(22) PCT Filed: Jul. 26, 2011

(86) PCT No.: PCT/JP2011/004204
§ 371 (c)(1),
(2), (4) Date: Jun. 19, 2013

(87) PCT Pub. No.: WO2012/066704
PCT Pub. Date: May 24, 2012

(65) Prior Publication Data

US 2013/0261894 A1 Oct. 3, 2013

(30) Foreign Application Priority Data

Nov. 18, 2010 (JP) ................................. 2010-258238

(51) Int. Cl.
*B62D 6/00* (2006.01)
*B62D 5/04* (2006.01)

(52) U.S. Cl.
CPC ............... *B62D 5/0463* (2013.01); *B62D 6/00* (2013.01); *B62D 5/0484* (2013.01); *B62D 5/049* (2013.01)
USPC ........................................... 701/41; 180/446

(58) Field of Classification Search
None
See application file for complete search history.

(56) References Cited

U.S. PATENT DOCUMENTS

| | | | |
|---|---|---|---|
| 4,905,783 A * | 3/1990 | Bober | 180/422 |
| 5,828,973 A * | 10/1998 | Takeuchi et al. | 701/41 |
| 6,062,336 A * | 5/2000 | Amberkar et al. | 180/443 |
| 6,148,949 A | 11/2000 | Kobayashi et al. | |

(Continued)

FOREIGN PATENT DOCUMENTS

| | | |
|---|---|---|
| JP | 4-208658 A | 7/1992 |
| JP | 11-59447 A | 3/1999 |

(Continued)

OTHER PUBLICATIONS

International Preliminary Report on Patentability dated Jun. 20, 2013 (PCT/IB/338 & PCT/IB/373), including English translation of Document C2 (Japanese-language Written Opinion (PCT/ISA/237)) previously filed on Mar. 20, 2012 (six (6) pages).

(Continued)

*Primary Examiner* — John R Olszewski
*Assistant Examiner* — David Merlino
(74) *Attorney, Agent, or Firm* — Crowell & Moring LLP

(57) ABSTRACT

An electric power steering apparatus includes a first torque calculating unit for calculating a first torque command based on a steering torque detected by the steering torque detecting unit, a second torque command calculating unit for calculating a second torque command based on the wheel rotation speed, an emergency switching unit for outputting the second torque command instead of the first torque command when error of the rotation torque is detected, a wheel rotation speed error detecting unit for detecting an error of the wheel rotation speed based at least on the wheel rotation speed, the steering torque in a normal state and the motor rotation information, and an emergency command limiting unit for liming the second torque command when normal and the motor rotation information, and where error of the wheel rotation speed is detected, when the second torque command is selected by the emergency switching unit.

19 Claims, 17 Drawing Sheets

(56) References Cited

U.S. PATENT DOCUMENTS

| | | | |
|---|---|---|---|
| 6,445,987 B1 * | 9/2002 | Kurishige et al. | 701/41 |
| 6,496,762 B2 * | 12/2002 | Kurishige et al. | 701/41 |
| 2008/0294313 A1 | 11/2008 | Aoki et al. | |

FOREIGN PATENT DOCUMENTS

| | | | |
|---|---|---|---|
| JP | 3390333 B2 | | 3/2003 |
| JP | 2005-67262 A | | 3/2005 |
| JP | 2005-193834 A | | 7/2005 |
| JP | 2006-143151 A | | 6/2006 |
| JP | 2006-248250 A | | 9/2006 |
| JP | 2009-6985 | | 1/2009 |
| JP | 2009-12511 A | | 1/2009 |
| JP | 2009-51291 A | | 3/2009 |
| JP | 2009-173180 A | | 8/2009 |
| JP | 2010-18268 A | | 1/2010 |
| JP | 2010018268 A | * | 1/2010 |
| JP | 2010-254152 A | | 11/2010 |
| JP | 2010-269763 A | | 12/2010 |
| JP | 2011-57163 A | | 3/2011 |

OTHER PUBLICATIONS

Japanese-language International Search Report ( Form PCT/ISA/210) dated Nov. 8, 2011 (two (2) pages).

Japanese-language International Preliminary Report (Form PCT/ISA/237) dated Nov. 8, 2011 (three (3) pages.

Japanese Office Action with English translation dated Jun. 25, 2013 (six (6) pages).

English translation of reference C1 previously filed on Mar. 20, 2012 (two (2) pages).

Chinese Office Action with English translation dated Mar. 21, 2014 (15 pages).

Chinese Office Action dated Sep. 18, 2014 with English-language translation (Fifteen (15) pages).

* cited by examiner

ELECTRIC POWER STEERING APPARATUS

TECHNICAL FIELD

The present invention relates to an electric power steering apparatus including a torque command calculating unit to calculate a torque command based at least on a steering torque, an electric motor to generate a steering assist force applied to a steering mechanism, and a motor control unit to control the electric motor based on the torque command.

BACKGROUND ART

Conventionally, it has been prevailed as a steering apparatus an electric power steering apparatus supplying a steering assist force to a steering mechanism by driving an electric motor according to a steering torque steered by a driver who steers a driving wheel as a steering device.

In the electric power steering apparatus of this kind, with the increase in size of a vehicle in which the apparatus is mounted, a trend toward a higher output of the electric power steering apparatus has been progressed, which accelerates necessity of a larger current as a motor torque increases.

As shown above, with the higher output of the power steering apparatus, a steering torque necessary during manual steering will increase under conditions where the electric power steering apparatus is stopped. This creates difficulty in the steering.

Traditionally, in the event an error of the steering torque sensor or the like occurs, the electric power steering apparatus is stopped its operation to make sure of safety. In this situation, the steering torque necessary for manual steering becomes too large making steering difficult. Even when the error of the steering torque sensor occurs, there is a need for continuous generation of a steering assist force by drive controlling the electric motor.

For this reason, when the error of the steering torque sensor occurs, it is known so far that an electric power steering apparatus in which a steering torque is estimated by a steering torque estimating unit based on a vehicle speed signal and a steering angle signal, and the drive control of an electric motor is effected based on an estimated steering torque (e.g. see Patent Document 1).

In the prior art disclosed in Patent Document 1, however, since the steering torque is estimated based on the vehicle speed signal and the steering angle signal, and the drive control of the electric motor is effected based on the estimated steering torque, it cannot properly recognize a steering state, such as driving, without holding a handle by a driver, using the estimated steering torque. This leads to a steering state, against the driver's will, where the steering wheel will be freely turned, thereby providing a driver with an uncomfortable feeling. Besides, there has been an unsolved problem since the steering torque is estimated without regarding a road surface condition, the steering torque cannot be estimated properly, once a state of not being considered in the torque estimation model, such as a low road surface friction coefficient, or the like is reached.

To solve the above-described unsolved problem, there is known an electric power steering apparatus (e.g. see Patent Document 2). In the conventional example described in Patent document 2, by taking account of a reaction force of the road surface actually produced from the road surface using a wheel rotation speed, that is a self-aligning torque, a moderate steering assist force is generated. By calculating the self-aligning torque from a wheel rotation speed and a motor angle derived from a motor rotation angle sensor, apart from the self-aligning estimation, an error estimation of the self-aligning torque is prevented by comparing a self-aligning torque estimation value and a self-aligning torque calculating value. The estimation of a driving wheel slip using the wheel rotation speed prevents a self steering during a driving wheel slippage. Limiting a control output according to the motor angular velocity derived from the vehicle speed and the motor rotation angle sensor continues a steering assist control while securely preventing the self steering or a control error output.

PRIOR ART DOCUMENTS

Patent Documents

Patent Document 1: JP 3390333 A
Patent Document 2: JP 2010-18268 A

SUMMARY OF THE INVENTION

Problem to be Solved

In the conventional example disclosed in Patent Document 2, however, there remains an unresolved problem, in which when an error occurs at the left and right wheel rotational speeds due to mounting of tires with different diameters, such as a temper tire. One of the left and right wheels of a vehicle travels, so-called, on a split road p, with one of which traveling a road surface with a high friction coefficient, such as a dry road, and the other of which traveling a road surface with a low friction coefficient, such as a frozen road or a snow-covered road. If an error should occur in the left and right vehicle rotational speed due to disturbance, an estimation error will be taken place in the self-aligning torque, thereby making it impossible to prevent the self-steering or a control error output with certainty.

Therefore, the present invention is made by focusing on the above open problem remained unresolved until now in the prior art and its object is to provide an electric power steering apparatus capable of preventing the occurrence of a self-steer and a control error output with certainty, even when an error occurs in the wheel rotation speed.

Solution to the Problem

In order to achieve the above object, according to a first aspect of the present invention, there is provided an electric power steering apparatus comprising: a steering torque detecting unit for detecting a steering torque input to a steering mechanism; a first torque command calculating unit for calculating a first torque command based on the steering torque detected by the steering torque detecting unit; an electric motor for generating a steering assist torque to be supplied o the steering mechanism.

In addition, the electric power steering apparatus according to the first aspect includes: a torque detecting unit error detecting unit for detecting error of the steering torque detecting unit; a wheel rotation speed detecting unit for detecting a wheel rotation speed of a vehicle; and a motor rotation information detecting unit for detecting motor rotation information of the electric motor.

Furthermore, the electric power steering apparatus according to the first aspect includes: a second torque command calculating unit for calculating a second torque command based on the wheel rotation speed detected by the wheel rotation speed detecting unit; an emergency switching unit for selecting the first torque command, when an error of the torque detecting unit is not detected by the torque detecting unit error detecting unit, and for selecting the second torque command calculating unit, when an error of the torque detecting unit is detected by the torque detecting unit error detecting unit; a motor control unit for drive controlling the electric motor based on the torque command selected by the emergency switching unit.

Moreover, the electric power steering apparatus according to the first aspect includes: a wheel rotation speed error detecting unit for detecting an error of the wheel rotation speed based on at least one of the wheel rotation speed detected by the wheel rotation speed detecting unit, the steering torque detected when the steering torque detecting unit is normal, and the motor rotation information detected by the motor rotation information detecting unit; and an emergency command limiting unit for limiting the second torque command when the second torque command is selected by the emergency switching unit, where the error of the wheel rotation speed is detected by the wheel rotation speed error detecting unit.

In the above configuration, the second torque command calculating unit calculates the torque command based on the wheel rotation speed detected by the wheel rotation speed detecting unit, and the emergency switching unit selects the second torque command computing unit instead of the first torque calculating unit when error is detected. This finds a correct torque detecting value taking account of a road reaction based on the wheel rotation speed. Further, the use of the wheel rotation speed detecting unit used in the anti-lock braking apparatus reduces the number of components.

Moreover, since where an error is detected in the second torque detection value based on at least one of the wheel rotation speed, the steering torque in a normal state, and the motor rotation information, when the second torque command of the second torque command calculating unit is selected by the emergency selecting unit, it securely prevents the occurrence of a self-steer and a control error output due to the second torque command.

Further, according to a second aspect of the electric power steering apparatus of the present invention, when the second torque command calculating unit may be selected instead of the first torque command calculating unit, the emergency switching unit gradually changes a command from the first torque command to the second torque command.

In the above configuration, since where the error of the second torque command is detected, an output of the second command is stopped, it securely prevents the occurrence of a self-steer and a control error output when the first command calculating unit is selected.

Moreover, according to a third aspect of the electric power steering apparatus of the present invention, the second torque command calculating unit may comprise a self-aligning torque estimating unit for estimating a self-aligning torque transmitted from a road surface to the steering mechanism based on the wheel rotation speed, and calculates the second torque command based on the self-aligning torque estimated by the self-aligning torque estimating unit.

In the above configuration, the self-aligning torque is estimated based upon the wheel rotation speed, thereby allowing the self-aligning torque transmitted from the road surface of the steering mechanism to be detected with accuracy.

In addition, according to a fourth aspect of the electric power steering apparatus of the present invention, when the second torque command calculating unit may be selected instead of the first torque command calculating unit, the emergency switching unit gradually changes a command from the first torque command to the second torque command.

In the above configuration, the torque command is gradually changed when switching from the first torque command to the second torque command, thereby preventing a drastic change in the steering assist force generated by the electric motor to continue a stable steering assist state.

Furthermore, according to a fifth aspect of the electric power steering apparatus of the present invention, there is provided an electric power steering apparatus comprising: a steering torque detecting unit for detecting a steering torque input to a steering mechanism; a first torque command calculating unit for calculating a first torque command based on the steering torque detected by the steering torque detecting unit; and an electric motor for generating a steering assist torque to be supplied o the steering mechanism.

Moreover, according to the fifth aspect, the electric power steering apparatus of the present invention includes: a torque detecting unit error detecting unit for detecting error of the steering torque detecting unit; a wheel rotation speed detecting unit for detecting a wheel rotation speed of a vehicle; a motor rotation information detecting unit for detecting motor rotation information of the electric motor; and a second torque command calculating unit for calculating a second torque command based on the wheel rotation speed detected by the wheel rotation speed detecting unit.

Moreover, according to the fifth aspect, the electric power steering apparatus of the present invention includes: an emergency switching unit for selecting the first torque command, when an error of the torque detecting unit is not detected by the torque detecting unit error detecting unit, and for selecting the second torque command calculating unit, when an error of the torque detecting unit is detected by the torque detecting unit error detecting unit; a motor control unit for drive controlling the electric motor based on the torque command selected by the emergency switching unit.

Moreover, according to the fifth aspect, the electric power steering apparatus of the present invention includes: a wheel rotation speed error detecting unit for detecting an error of the wheel rotation speed based on at least one of the wheel rotation speed detected by the wheel rotation speed detecting unit, the steering torque detected when the steering torque detecting unit is normal, and the motor rotation information detected by the motor rotation information detecting unit; and an emergency command limiting unit for limiting the second torque command when the second torque command is selected by the emergency switching unit, where the error of the wheel rotation speed is detected by the wheel rotation speed error detecting unit.

Moreover, according to the fifth aspect, in the electric power steering apparatus of the present invention, the second torque command calculating unit may include a self-aligning torque estimating unit for estimating a self-aligning torque transmitted from a road surface side to the steering mechanism based on the wheel rotation speed, and a gain adjusting unit for calculating the second torque command by multiplying gain with the self-aligning torque estimated by the self-aligning torque estimating unit.

In the above configuration, in addition to the effects of the first aspect, the second torque command is calculated by multiplying the self-aligning torque estimate value by the gain, whereby the second torque command can be appropriate by setting the gain in accordance with the wheel state or the driving state of the vehicle.

In addition, according to a sixth aspect of the electric power steering apparatus of the present invention, the gain adjusting unit may comprise at least one of a steering state gain adjusting unit, a vehicle speed gain adjusting unit, a self-aligning torque gain adjusting unit, and a driving wheel slip gain adjusting unit.

The steering state gain adjusting unit determines whether in which steering states a vehicle is among a wheel overturning sate, a wheel turning-back state, and a wheel holding state, based upon the motor rotation information detected by the motor rotation information detecting unit and the self-aligning torque estimated by the self-aligning torque estimating unit, and adjusts the wheel state sensitive gain based upon the determination result of the wheeling state.

The vehicle speed gain adjusting unit may adjusts vehicle speed sensitive gain based on either of the vehicle speed calculated based on the wheel rotation speed detected by the wheel rotation speed detecting unit or the vehicle speed detected by the vehicle speed detecting unit.

The self-aligning torque gain adjusting unit may adjust the self-aligning torque gain on the basis of a deviation between the motor rotation information detected by the motor rotation information detecting unit and the vehicle rotation speed detected by the wheel rotation speed detecting unit, and the self-aligning torque estimating value estimated by the self-aligning torque estimating unit.

The driving wheel slip gain adjusting unit may estimate a driving wheel slip state based on the wheel rotation speed detected by the wheel rotation speed detecting unit, and for adjusting driving wheel slip sensitive gain based on the estimated driving wheel slip state.

In the above configuration, the steering state gain adjusting unit makes adjustable the optimum steering state sensitive gain depending on the steering state, which allows calculation of an optimum second torque command depending on the steering state.

Additionally, since the vehicle speed sensitivity gain can be adjusted by the vehicle speed gain adjusting unit depending on the vehicle speed, thereby improving a steering feeling of the vehicle.

Furthermore, the self-aligning torque setting unit sets the self-aligning torque gain on the basis of a deviation between the self-aligning torque calculating value calculated based on the motor rotation information and the wheel rotation speed, and the self-aligning torque estimation value, when an error is occurred in the self-aligning torque estimation value calculated by the wheel rotation speed, the error cal be suppressed.

Moreover, the driving wheel slip gain adjusting unit can suppress an influence effected by the driving wheel slip, when the self-aligning torque estimation value is affected by the driving wheel slip.

In addition, according to a seventh aspect of the electric power steering apparatus of the present invention, when the second torque command calculating unit is selected instead of the first torque command calculating unit, the emergency switching unit may gradually change a command from the first torque command to the second torque command.

In the above configuration, since the torque command is gradually changed when switching from the first torque command to the second torque command, a sudden change in the steering assist force generated in the electric motor can be prevented, thereby continuing a stable steering assist state.

In addition, according to an eighth aspect of the electric power steering apparatus of the present invention, there is provided an electric power steering apparatus comprising: a steering torque detecting unit for detecting a steering torque input to a steering mechanism; a first torque command calculating unit for calculating a first torque command based on the steering torque detected by the steering torque detecting unit; and an electric motor for generating a steering assist torque to be supplied o the steering mechanism.

Furthermore, according to the eighth aspect, the electric power steering apparatus includes: a torque detecting unit error detecting unit for detecting error of the steering torque detecting unit; a wheel rotation speed detecting unit for detecting a wheel rotation speed of a vehicle; and a motor rotation information detecting unit for detecting motor rotation information of the electric motor.

Moreover, according to the eighth aspect, the electric power steering apparatus includes: a second torque command calculating unit for calculating a second torque command based on the wheel rotation speed detected by the wheel rotation speed detecting unit; an emergency switching unit for selecting the first torque command, when an error of the torque detecting unit is not detected by the torque detecting unit error detecting unit, and for selecting the second torque command calculating unit, when an error of the torque detecting unit is detected by the torque detecting unit error detecting unit; and a motor control unit for drive controlling the electric motor based on the torque command selected by the emergency switching unit.

Furthermore, according to the eighth aspect, the electric power steering apparatus includes: a wheel rotation speed error detecting unit for detecting an error of the wheel rotation speed based on at least one of the wheel rotation speed detected by the wheel rotation speed detecting unit, the steering torque detected when the steering torque detecting unit is normal, and the motor rotation information detected by the motor rotation information detecting unit; and an emergency command limiting unit for limiting the second torque command when the second torque command is selected by the emergency switching unit, where the error of the wheel rotation speed is detected by the wheel rotation speed error detecting unit.

Furthermore, according to the eighth aspect, the second torque command calculating unit comprises a self-aligning torque estimating unit for estimating a self-aligning torque transmitted from a road surface side to the steering mechanism based on the wheel rotation speed, a gain adjusting unit for calculating the second torque command by multiplying gain with the self-aligning torque estimated by the self-aligning torque estimating unit, and a torque control unit for limiting the second torque command calculated by the gain adjusting unit on the basis at least on either of a vehicle speed calculated based on the wheel rotation speed detected by the wheel rotation speed detecting unit or a vehicle speed detected by the vehicle speed detecting unit, and a motor angular velocity calculated by the motor angular velocity calculating unit.

In the above configuration, in addition to the effects of the first aspect, the second torque command after the gain adjustment is limited based upon at least one of the vehicle speed and the motor angular velocity, thereby suppressing the control output error in a high-speed region or high-more angular velocity region.

In addition, according to a ninth aspect of the electric power steering apparatus of the present invention, in the above eighth aspect, the gain adjusting unit may comprise at least one of a steering state gain adjusting unit, a vehicle speed gain adjusting unit, a self-aligning torque gain adjusting unit, and a driving wheel slip gain adjusting unit.

The steering state gain adjusting unit determines whether in which steering states a vehicle is among a wheel overturning sate, a wheel turning-back state, and a wheel holding state, based upon the motor rotation information detected by the motor rotation information detecting unit and the self-aligning torque estimated by the self-aligning torque estimating unit, and adjusts the wheel state sensitive gain based upon the determination result of the wheeling state.

The vehicle speed gain adjusting unit may adjusts vehicle speed sensitive gain based on either of the vehicle speed calculated based on the wheel rotation speed detected by the wheel rotation speed detecting unit or the vehicle speed detected by the vehicle speed detecting unit.

The self-aligning torque gain adjusting unit may adjust the self-aligning torque gain on the basis of a deviation between the motor rotation information detected by the motor rotation information detecting unit and the vehicle rotation speed detected by the wheel rotation speed detecting unit, and the self-aligning torque estimating value estimated by the self-aligning torque estimating unit.

The driving wheel slip gain adjusting unit may estimate a driving wheel slip state based on the wheel rotation speed detected by the wheel rotation speed detecting unit, and for adjusting driving wheel slip sensitive gain based on the estimated driving wheel slip state.

In the above configuration, the steering state gain adjusting unit makes adjustable the optimum steering state sensitive gain depending on the steering state, which allows calculation of an optimum second torque command depending on the steering state. Additionally, since the vehicle speed sensitivity gain can be adjusted by the vehicle speed gain adjusting unit depending on the vehicle speed, thereby improving a steering feeling of the vehicle.

Furthermore, the self-aligning torque setting unit sets the self-aligning torque gain on the basis of a deviation between the self-aligning torque calculating value calculated based on the motor rotation information and the wheel rotation speed, and the self-aligning torque estimation value, when an error is occurred in the self-aligning torque estimation value calculated by the wheel rotation speed, the error cal be suppressed. Moreover, the driving wheel slip gain adjusting unit can suppress an influence effected by the driving wheel slip, when the self-aligning torque estimation value is affected by the driving wheel slip.

In addition, according to a tenth aspect of the electric power steering apparatus of the present invention, in the above ninth aspect, when the second torque command calculating unit is selected instead of the first torque command calculating unit, the emergency switching unit may gradually change a command from the first torque command to the second torque command.

In the above configuration, the torque command is gradually changed when switching from the first torque command to the second torque command, thereby preventing a drastic change in the steering assist force generated by the electric motor to continue a stable steering assist state.

In addition, according to an eleventh aspect of the electric power steering apparatus of the present invention, in any one of the above first to tenth aspects, when the error of the wheel rotation speed is detected, the emergency command limiting unit may stop an output of the second torque command when the second torque command calculating unit is selected.

In the above configuration, when an error of the second torque command is detected, the second command is stopped to be output when the first torque command calculating unit is selected, thereby preventing an occurrence of self-steering or control error output with certainty.

In addition, according to a twelfth aspect of the electric power steering apparatus of the present invention, in any one of the above first to tenth aspects, where the error of the wheel rotation speed is detected when the second torque command calculating unit is selected, the emergency command limiting unit may limit the second torque command based on a left and right wheel rotation speed difference obtained by detecting the second torque command by the wheel rotation speed detecting unit.

In the above configuration, when the error of the wheel rotation speed is detected, the second torque command is limited based on the left and right wheel rotation speed difference detected by the wheel rotation speed detecting unit, thereby preventing the occurrence of the self-steer and a control error output with certainty.

In addition, according to a thirteenth aspect of the electric power steering apparatus of the present invention, in any one of the above first to tenth aspects, where the error of the wheel rotation speed is detected, when the second torque command calculating unit is selected, the emergency command limiting unit set, as a second torque commend, the second torque command before the error is detected.

In the above configuration, when the error of the wheel rotation speed is detected, a second torque command before detecting the error is set as the second torque command, a steering assist control can be continued based on the second torque command before occurring the error, thereby preventing the occurrence of the self-steer and the control error output with certainty.

In addition, according to a fourteenth aspect of the electric power steering apparatus of the present invention, in any one of the above first to tenth aspects, the self-aligning torque estimating unit may comprise a vehicle sideslip angle estimating unit for estimating a wheel sideslip angle based on the wheel rotation speed, and estimate the self-aligning torque based on the vehicle sideslip angle estimated by the vehicle sideslip angle estimating unit.

In the above configuration, since the wheel sideslip angle of the vehicle is estimated based on the wheel rotation speed, and self-aligning torque is estimated based on the estimated wheel sideslip angle, more accurate self-aligning torque estimation can be achieved taking a traveling condition of the vehicle into account.

In addition, according to a fifteenth aspect of the electric power steering apparatus of the present invention, in the above fourteenth aspect, the vehicle sideslip angle estimating unit may estimate the vehicle sideslip angle based on the wheel rotation speed and to correct the estimated sideslip angle based on the motor rotation information detected by the motor rotation information detecting unit.

In the above configuration, the vehicle sideslip angle is estimated based on the vehicle rotation speed of the vehicle, and the estimated sideslip angle is compensated based on the motor rotation information, more accurate sideslip angle can be estimated based on in which steering states the vehicle is.

In addition, according to a sixteenth aspect of the electric power steering apparatus of the present invention, in the above fourteenth aspect, when the error of the wheel rotation speed is detected, the emergency command limiting unit may stop an output of the second torque command when the second torque command calculating unit is selected.

In the above configuration, when the error of the second torque command is detected, an output of the second command is stopped, whereby securely prevents the occurrence of a self-steer and a control error output when the first command calculating unit is selected.

In addition, according to a seventeenth aspect of the electric power steering apparatus of the present invention, in the above fourteenth aspect, where the error of the wheel rotation speed is detected when the second torque command calculating unit is selected, the emergency command limiting unit may limit the second torque command based on a left and right wheel rotation speed difference obtained by detecting the second torque command by the wheel rotation speed detecting unit.

In the above configuration, when the error of the wheel rotation speed is detected, the second torque command is limited based on the left and right wheel rotation speed difference detected by the wheel rotation speed detecting unit, whereby may securely prevent the occurrence of the self-steer and a control error output.

In addition, according to an eighteenth aspect of the electric power steering apparatus of the present invention, in the above fourteenth aspect, where the error of the wheel rotation speed is detected, when the second torque command calculating unit is selected, the emergency command limiting unit set, as a second torque commend, the second torque command before the error is detected.

In the above configuration, when the error of the wheel rotation speed is detected, a second torque command before detecting the error is set as the second torque command, a steering assist control can be continued based on the second torque command before occurring the error, thereby preventing the occurrence of the self-steer and the control error output.

In addition, according to a nineteenth aspect of the electric power steering apparatus of the present invention, in any one of the above third to tenth aspects, the self-aligning torque estimating unit may estimate the self-aligning torque based on the wheel rotation speed and the motor rotation information detected by the motor rotation information detecting unit.

In the above configuration, since the self-aligning torque is estimated based on the left and right wheel rotation speed and the motor rotation information of the vehicle, more accurate estimation of the self-aligning can be achieved depending on in which steering states the vehicle is.

In addition, according to a twentieth aspect of the electric power steering apparatus of the present invention, in the above nineteenth aspect, when an error of the wheel rotation speed is detected, the emergency command limiting unit may stop an output of the second torque command when the second torque command calculating unit is selected.

In the above configuration, when the error of the second torque command is detected, an output of the second command is stopped, thereby securely preventing the occurrence of a self-steer and a control error output when the first command calculating unit is selected.

In addition, according to a twenty-first aspect of the electric power steering apparatus of the present invention, in the above nineteenth aspect, where the error of the wheel rotation speed is detected when the second torque command calculating unit is selected, the emergency command limiting unit may limit the second torque command based on a left and right wheel rotation speed difference obtained by detecting the second torque command by the wheel rotation speed detecting unit.

In the above configuration, when the error of the wheel rotation speed is detected, the second torque command is limited based on the left and right wheel rotation speed difference detected by the wheel rotation speed detecting unit, it may securely prevent the occurrence of the self-steer and a control error output.

In addition, according to a twenty-second aspect of the electric power steering apparatus of the present invention, in the above nineteenth aspect, where the error of the wheel rotation speed is detected, when the second torque command calculating unit is selected, the emergency command limiting unit may set, as a second torque commend, the second torque command before the error is detected.

In the above configuration, since when the error of the wheel rotation speed is detected, a second torque command before detecting the error is set as the second torque command, a steering assist control can be continued based on the second torque command before occurring the error, it may securely prevent the occurrence of the self-steer and the control error output.

Advantageous Effects of the Invention

According to the present invention, since the second torque calculating unit calculates a torque command based on the wheel rotation speed, when an error of the steering torque detecting unit is detected, an accurate torque detecting value taking account of a road surface condition can be found. In addition, since the second torque command is limited when the error of the wheel rotation speed is occurred, it may prevent the occurrence of the self-steer and the control error output.

DESCRIPTION OF EMBODIMENTS

Hereinafter, a description will be made with reference to the attached drawings.

Figure 1:
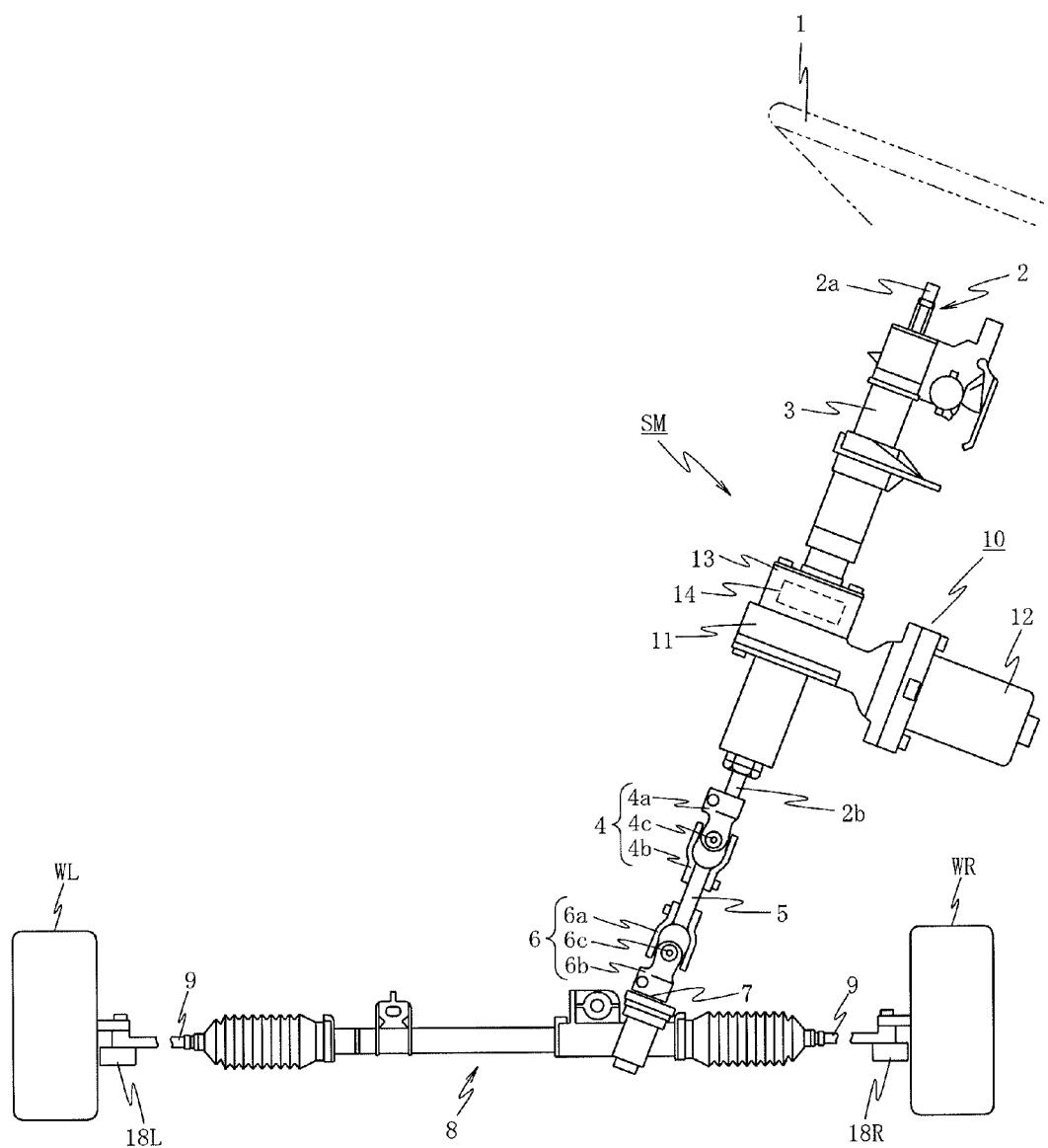
FIG. 1 is a view showing a schematic configuration of an electric power steering apparatus according a first embodiment of to the present invention.

FIG. 1 is a schematic block diagram showing an embodiment of the present invention. In FIG. 1, SM denotes a steering mechanism. The steering mechanism SM includes a steering shaft 2 made of an input shaft 2a to which a steering force acted to a steering wheel 1 by a driver is transmitted and an output shaft 2b coupled via a torsion bar, not shown, to the input shaft 2a. The steering shaft 2 is rotatably installed in a steering column 3, one end of the input shaft 2a is coupled to the steering wheel 1 and the other end thereof is coupled to the torsion bar, not shown.

Then, the steering force transmitted to the output shaft 2b is transmitted to an intermediate shaft 5 via a universal joint 4 composed of two yokes 4a, 4b and a cross linked part 4c coupling these yokes. Further, the steering force is transmitted via the universal joint 6 composed of the two yokes 4a, 4b and the cross linked part 6c to a pinion shaft 7. The steering force transmitted to the pinion shaft 7 is converted into a translatory movement in a vehicle width direction by a steering gear mechanism 8, and is transmitted to left and right tie rods 9 to steer steering wheels WL, WR by the tie rods 9.

To the output shaft 2b of the steering shaft 2, a steering assist mechanism 10 to transmit a steering assist force to the output shaft 2b is coupled. The steering assist mechanism 10 includes a decelerating mechanism 11 coupled to the output shaft 2b and an electric motor 12 made of, for example, a brushless motor as an electric motor to generate a steering assist force coupled to the decelerating mechanism 11.

A steering torque sensor 14 as steering torque detecting unit is disposed within the housing 13 coupled to the steering wheel 1 side of the decelerating mechanism 11. The steering torque sensor 14 is for detecting a steering torque applied to the steering wheel 1 and then transmitted to the input shaft 2a. That is to say, the steering torque sensor 14 is configured to convert, for example, the steering torque into angular displacement of the torsion bar, not shown, which is interposed between the input shaft 2a and the output shaft 2b, and to detect the twist angular displacement with a non-contact magnetic sensor.

Figure 2:
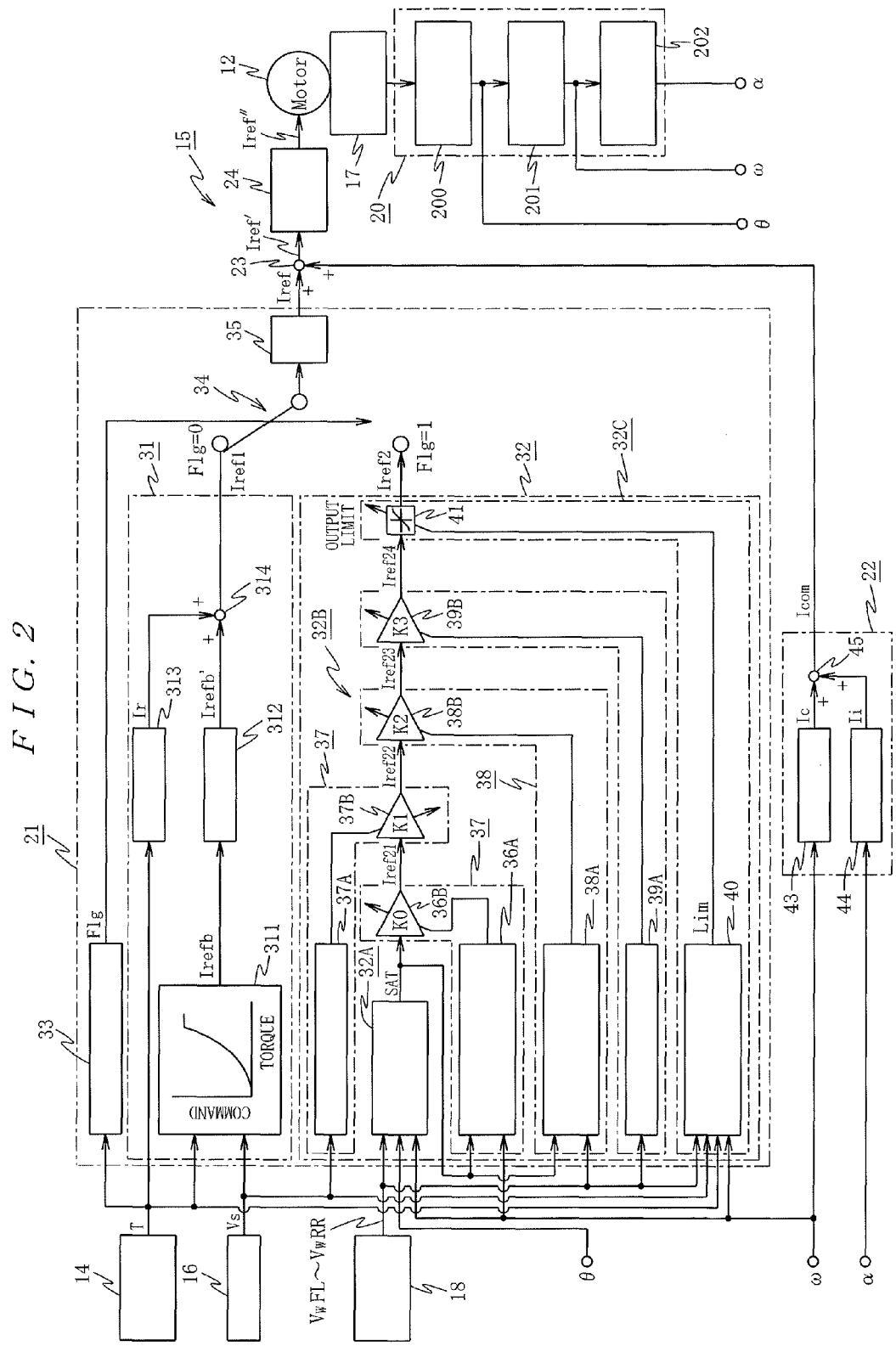
FIG. 2 is a block diagram showing a specific example of a controller according to the present invention.

As shown in FIG. 2, a steering torque detection value T output from the steering torque sensor 14 is input to a controller 15. To the controller 15, in addition to a vehicle speed Vs detected by a vehicle speed sensor 16, motor currents Iµ to Iw flown to the electric motor 12 are input. Also, to the controller 15, a rotation angle θ of the electric motor 12 detected by a motor rotation angle sensor 17 composed of a resolver, an encoder, and the like, and left and right wheel rotation speeds VwL, VwR detected by wheel rotation speed sensors 18L, 18R are input.

The controller 15 calculates a first steering assist torque commend Iref1 as a current command which causes the electric motor 12 to generate a steering assist force depending on the input torque detection value T and the vehicle speed Vs, in the state where the steering torque sensor 14 is in an normal state. The controller 15 drive controls the electric motor 12 after a variety of compensation process are executed on the basis of a motor angular velocity ω and motor angular acceleration α calculated based on the rotation angle θ in response to the calculated steering assist torque command Iref1. Moreover, when an error occurs at the steering torque sensor 14, a second steering assist torque Iref2 is calculated based on the wheel rotations speeds VwL, VwR of left and driven wheels, and drive controls the electric motor 12 based on the second steering assist torque command Iref2.

Namely, as shown in FIG. 2, the controller 15 is composed of a motor rotation information calculating part 20, a steering assist torque command calculating part 21, an adder 23, and a motor driving circuit 24.

The motor rotation information calculating part 20 calculates the motor angular velocity ω and the motor angular acceleration α based on the motor speed θ detected by the motor rotating angle sensor 17. The steering assist torque command calculating part 21 calculates a steering assist torque command Iref, based on the vehicle speed Vs and four wheel rotation speeds VwRL, VwRR.

The torque command compensating part calculates a commend compensation value Icom for compensating the torque command Iref calculated by the steering assist torque command calculating part 21. The adder 23 calculates the compensated steering assist torque command Iref' by adding the steering assist torque command Iref calculated by the steering assist torque command calculating part 21 to the command compensation value Icom calculated by the torque command compensating part 22. The motor driving circuit 24 drive controls the electric motor 12 by generating a motor current based on the compensated steering assist torque command Iref' output from the adder 23.

The rotation information calculating part 20 includes a motor angle signal sensor 200 to calculate the motor angle θ based on a motor angle detection signal detected by the motor rotating angle sensor 17, a motor angular velocity calculating part 201 to calculate the motor angular velocity ω by differentiating the motor angle θ calculated by the motor angular velocity calculating part 201, and a motor angular acceleration calculating part 202 calculates the motor angular acceleration α by differentiating the angular velocity ω calculated by the motor angular velocity calculating part 201.

The steering assist torque command calculating part 21, specifically, includes a first steering assist torque command calculating part 31, a second steering assist torque command calculating part 32, a torque sensor error detecting part 33, a command selecting part 34, and a rate limiter 35.

The first steering assist torque command calculating part 31 calculates the first steering assist torque command Iref1 based on the steering torque T input from the steering torque sensor 14 and the vehicle speed Vs input from the vehicle speed sensor 16.

The second steering assist torque command calculating part 32 calculates the second steering assist torque command Iref2 based on the wheel rotation speeds VwL, VwR input from the wheel rotation speed sensor 18 which detects the left and right wheel rotation speeds.

The torque sensor error detecting part 33 detects an error of the steering torque sensor 14. The command selecting part 34 selects either of the first steering assist torque command calculating part 31 or the second steering assist torque command calculating part 32 based on an error detection signal output from the torque sensor error detecting part 33. The rate limiter 35 suppresses an abrupt change in the command selected by the command selecting part 34.

The first steering assist torque command calculating part 31 includes a torque command calculating part 311, a phase compensation part 312, a center responsiveness improving part 313, and an adder 314.

The torque command calculating part 311 calculates a steering assist torque command Irefb that is a current command, referring to a steering assist torque command calculating map shown in FIG. 2, based on the steering assist torque T and the vehicle speed Vs. The phase compensation part 312 calculates the phase compensation value Irefb by phase compensating the steering assist torque command Irefb output from the torque command calculating part 311.

The center responsiveness improving part 313 calculates a center responsiveness improving command Ir for securing safety and compensating static friction in an assist characteristic dead zone by differentiating a steering torque T so that an improved responsiveness is achieved in the vicinity of steering neutral and smooth steering is realized based on the steering torque T input from the steering torque sensor 14. the adder 314 calculates the first steering assist torque command Iref1 by adding a phase compensation output from the phase compensating part 312 and the center responsiveness improving command Ir from the center responsiveness improving part 313.

Here, as shown in FIG. 2, the steering assist torque command calculating map referred to by the torque command calculating part 311 takes the steering torque T as its horizontal axis and the steering assist torque command Iref as its vertical axis. The steering assist torque command calculating map is configured of a characteristic diagram indicated by a parabolic curved line in which the vehicle speed Vs is taken as a parameter.

The second torque command calculating part 32 includes a self-aligning torque estimating part 32A as a self-aligning estimating unit, a gain adjusting part 32B, and a torque limiting part 32C as an emergency command limiting part.

The self-aligning torque estimating part 32A estimates a self-aligning torque transmitted from a road surface to the steering mechanism. The gain adjusting part 32B calculates a second steering assist torque commend Iref2 by multiplying gain by the self-aligning torque SAT estimated by the self-aligning torque estimating part 32A. The torque limiting part 32C limits the self-aligning torque, the gain of which has been adjusted by the gain adjusting part 32B.

Figure 3:
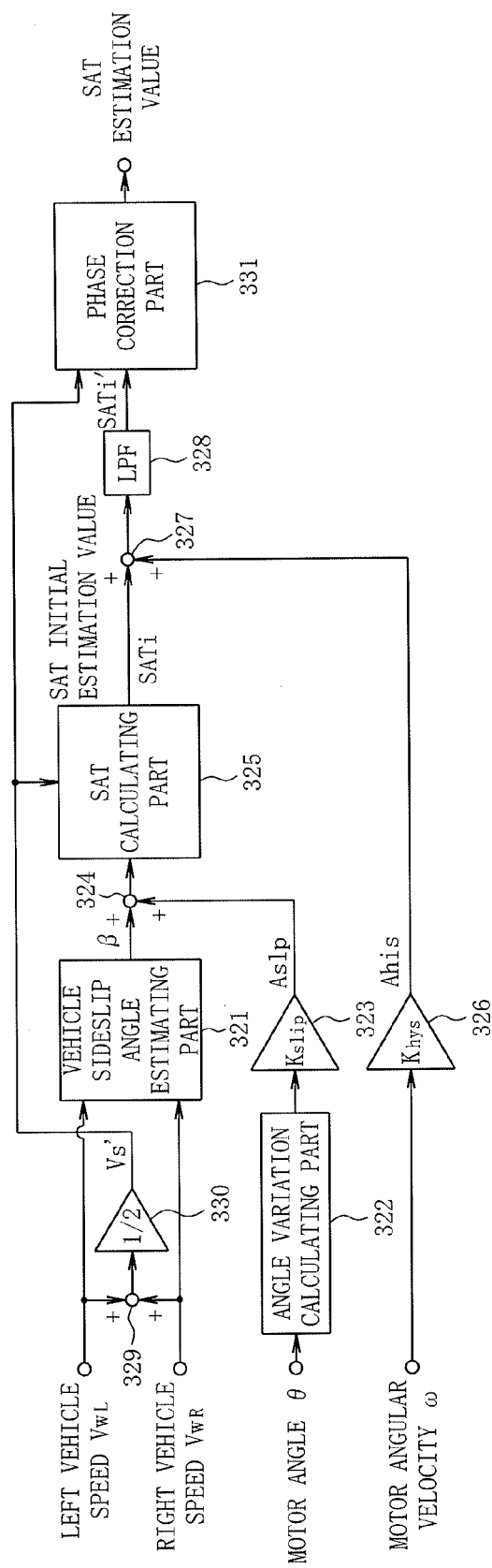
FIG. 3 is a block diagram showing a specific configuration of a self-aligning torque estimating unit included in the controller.

That is, as shown in FIG. 3, the self-aligning torque estimating unit 32A, includes a sideslip angle estimating part 321 to estimate a vehicle sideslip angle β based on the left and right wheel rotation speeds VwL, VwR, and an angle variation calculating part 322 to calculate an angle variation Δθ by inputting the motor angle θ.

In addition, the self-aligning torque estimating unit 32A includes an amplifier 323 where a correction gain Kslp is set, to which an angular variation Δθ calculated by the angular variation calculating part 322 is input, and an adder 324 to make a correction using a tire torsion amount by adding a slip angle correction value Aslp calculated by the amplifier 323 to the sideslip angle β estimated by the sideslip angle estimation part 321.

Furthermore, the self-aligning torque estimating unit 32A includes a self-aligning torque calculating part 325 to calculate a self-aligning torque initial estimation value based on the an added output of the adder 324, and an amplifier 326 to calculate a hysteresis correction value Ahys by amplifying the motor angular velocity ω to correct the hysteresis characteristics of the self-aligning torque initial estimation value SATi calculated by the self-aligning torque calculating part 325.

Moreover, the self-aligning torque estimating unit 32A includes an adder 327 to add the hysteresis correction value Ahys calculated by the amplifier 326 to the self-aligning torque initial value SATi, a low pass filter 328 to remove a noise from the added output of the adder 327, an adder 329 to add the wheel rotations speeds VwL, VwR input from the wheel rotation speed sensors L, 18R, respectively.

Moreover, the self-aligning torque estimating unit 32A includes an average value calculating part 330 to calculate a wheel speed equivalent value Vs' by calculating ½ of the added value of the wheel rotation speeds VwL, VwR, and a phase correction part 331 to calculate the self-aligning torque estimation value SAT by phase correcting the self-aligning torque initial estimation value SATi, the noise of which is output from the low pass filter 328 is removed based on the wheel speed equivalent value Vs' calculated by the average value calculating part 330.

Here, the vehicle sideslip angle estimating part 321 calculates the following equation (1) based on the wheel rotation speeds VwRL, VwRR detected by the wheel rotation speed sensors 18RL, 18RR of rear wheels serving as driving wheels to calculate a left and right wheel rotation speed difference ΔVwR depending on wheel speeds.

$$\Delta VwR = (VwRL - VwRR)/\{(VwRL + VwRR)/2\} \quad (1)$$

Figure 4:
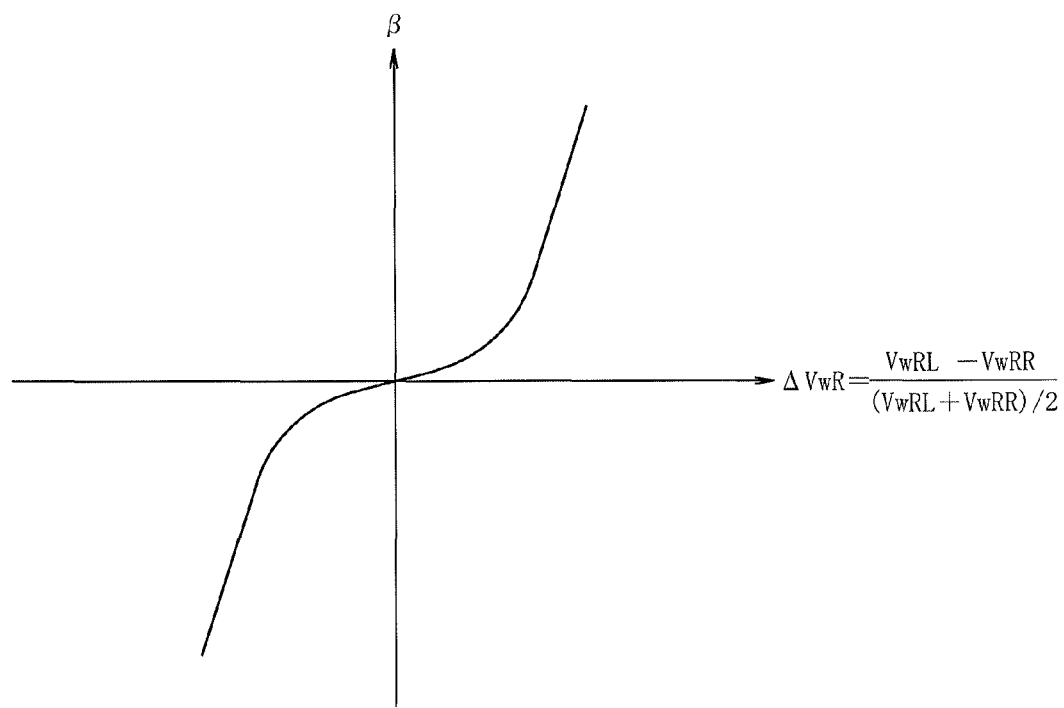
FIG. 4 is a characteristic diagram showing a sliding angle calculating map.

Next, the vehicle sideslip angle β is estimated, by referring to a vehicle sideslip angle calculating map shown in FIG. 4, based on the calculated wheel rotation speed difference ΔVw. As shown in FIG. 4, the vehicle sideslip angle calculating map is represented by a characteristic diagram obtained from measured values of a practical vehicle with the wheel rotation speed difference ΔVwR taken an its horizontal axis and the wheel sideslip angle β taken as its vertical axis. When the wheel rotation speed difference ΔVw is close to zero, the characteristic curved line L shows a relatively gentle slope, and when the wheel rotation speed difference ΔVw gets larger, the characteristic curved line L shows a relatively steep slope.

Figure 5:
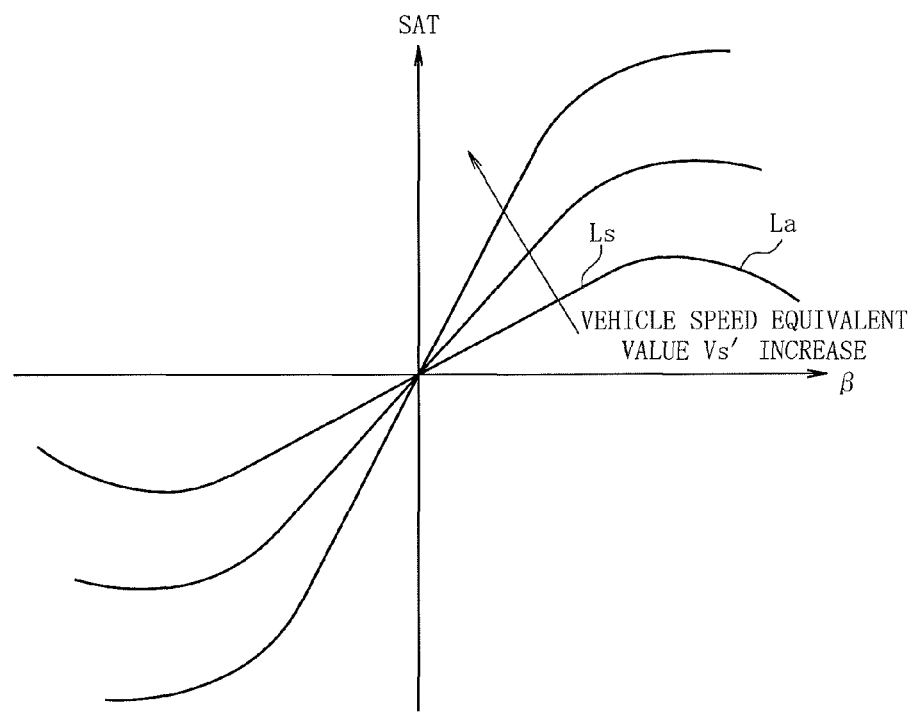
FIG. 5 is a characteristic diagram showing a self-aligning torque initial estimation value calculating map.

On the other hand, the self-aligning torque calculating part 325 calculates the self-aligning torque initial estimation value SATi, by referring to the self-aligning torque initial estimation value calculating map shown in FIG. 5, based on the wheel slide angle β.

As shown in FIG. 5, the self-aligning torque initial estimation value calculating map is represented by the characteristic diagram in which the wheel sideslip angle β is taken as its horizontal axis and the self-aligning torque initial estimation value SATi as its vertical axis. A characteristic line is set composed of a linear region Ls where a tilt angle increases in proportion to an increase in the wheel speed equivalent value Vs' and a saturation region La that extends from both ends of the linear region Ls.

Figure 6:
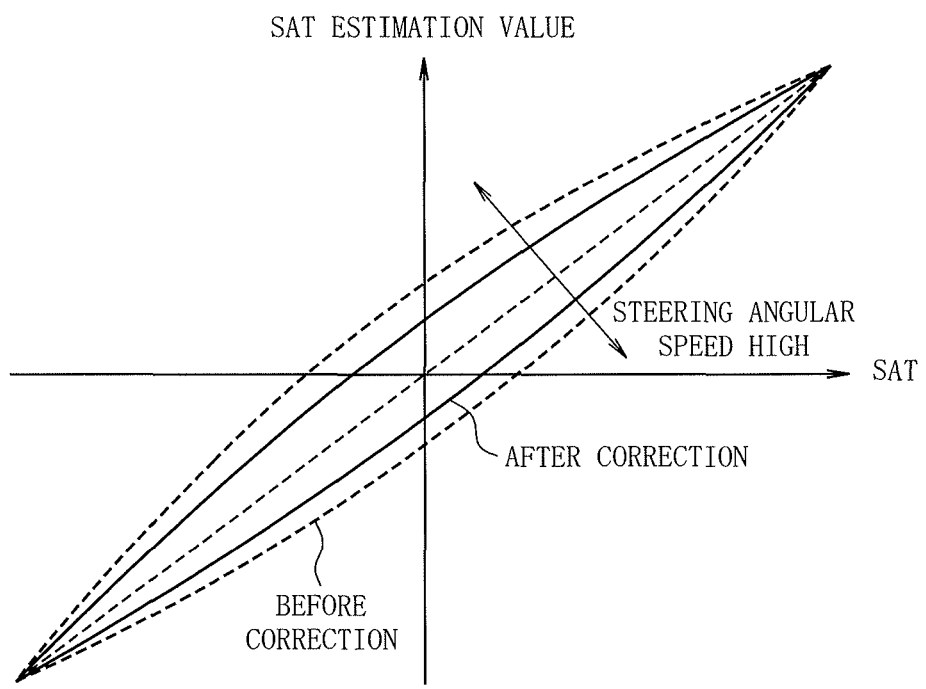
FIG. 6 is a characteristic diagram showing hysteresis characteristics of the self-aligning torque initial estimation value with respect to actual self-aligning.

A relationship between the self-aligning torque initial estimation value SATi calculated by the self-aligning torque calculating part 325 and the self-aligning torque SAT which really occurs in a vehicle will result in relatively large hysteresis characteristics, as indicated by a dotted line in FIG. 6.

As such, by calculating the hysteresis correction value Ahys based on the motor angular velocity $\omega$ and by adding the hysteresis correction value Ahys to the self-aligning torque initial estimation value SATi, the hysteresis characteristics is corrected depending on the motor angular velocity i.e. the steering angle speed. Thus, the width of the hysteresis characteristics is reduced as indicated by a solid line as shown in FIG. 6, thereby calculating the more accurate self-aligning torque initial estimation value SATi.

The phase correction part 331 corrects a phase of the self-aligning torque estimation value SAT', the noise of which is removed and is output from the low pass filter 326, based on the vehicle speed equivalent value Vs' output from the average value calculating part 330. The phase correction part 331 is made of a first-order delay filter (1/T1s+1) having steady gain=1, where s is laplacian operator, $T_1$ is time constant. The time constant $T_1$ is set according to the vehicle speed proportionate value Vs'.

Meanwhile, the gain adjusting part 32B includes a steering state gain adjusting part 36, a vehicle speed gain adjusting part 37, a self-aligning torque gain adjusting part 38, and a driving wheel slip gain adjusting part 39.

The steering state gain adjusting part 36 receives the self-aligning torque estimation value SAT output from the self-aligning torque estimation part 32A and the motor angular velocity $\omega$ calculated by the motor angular velocity calculating part 201, and detects to determine whether the wheel is in any of the wheel over-turning state, the wheel turning-back state, or the wheel holding state. The steering state gain adjusting part 36 includes a steering state gain setting part 36A to set a steering state gain KO depending on the detected state.

The steering state gain adjusting part 36 includes a gain multiplying part 38B to output a gain doubling command Iref21 by multiplying the steering state gain KO set by the steering state gain setting part 36A by the self-aligning torque estimation value SAT output from the self-aligning torque estimation part 32A.

Figure 7:
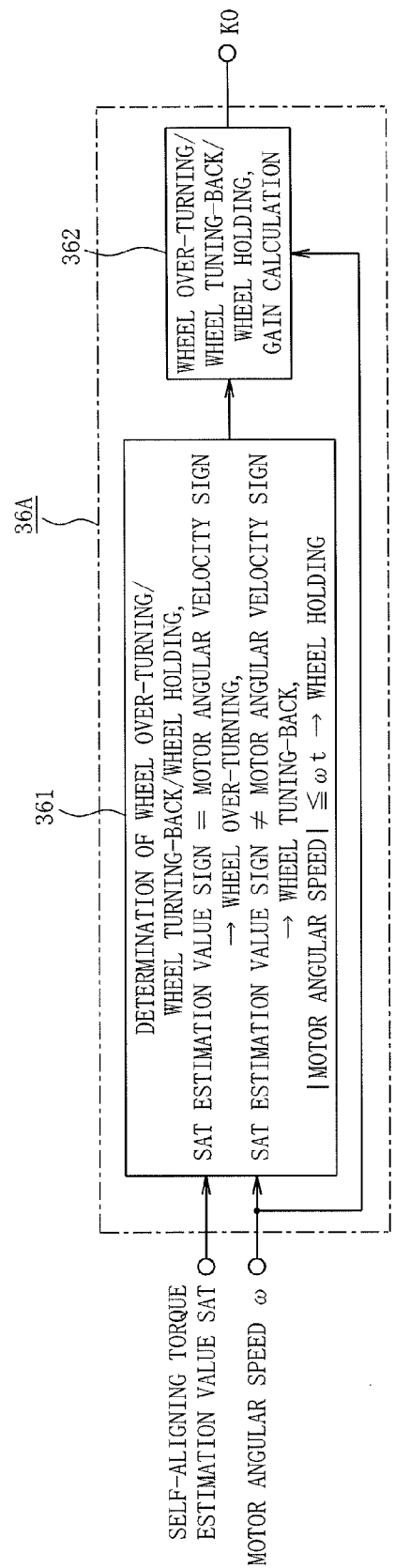
FIG. 7 is a block diagram showing a specific configuration of a steering state gain setting part.

Herein, as a specific structure of the steering state gain setting part 36A, as shown in FIG. 7, there are a steering state determining part 361 for receiving the self-aligning torque estimation value SAT and the motor angular velocity $\omega$ to determine whether the wheel is in any of the wheel over-turning state, the wheel turning-back state, and the wheel holding state, and a steering state gain calculating part 362 to calculate the steering state gain KO based on the determination result of the steering state determining part 361 and the motor angular velocity $\omega$.

The steering state determining part 361 determines the wheel over-turning state when a sign of the self-aligning torque estimation value SAT matches that of the motor angular velocity $\omega$, determines the wheel turning-back state when the sign of the self-aligning torque estimation value SAT does not match that of the motor angular velocity $\omega$, and determines the wheel holding state when an absolute value $|\omega|$ of the motor angular velocity $\omega$ is smaller than or equal to a setting value $\omega t$.

Figure 8:
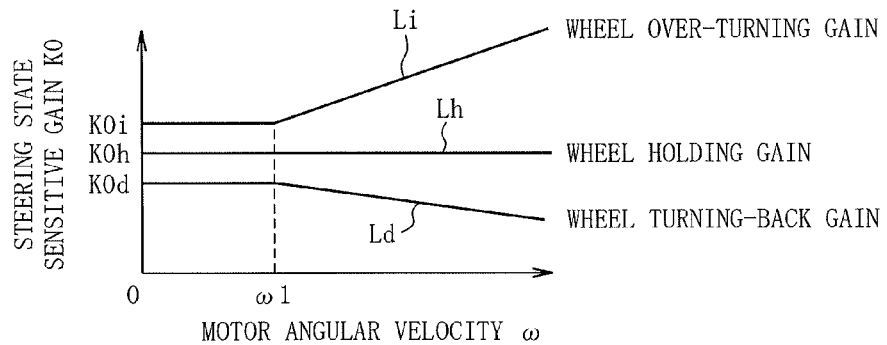
FIG. 8 is a characteristic diagram showing a steering state sensitive gain calculating map applied to the steering state gain setting part.

The steering state gain calculating part 362 calculates the steering state gain KO, by referring to the steering state gain calculating map shown in FIG. 8, based on the input steering state and the motor angular velocity $\omega$. As shown in FIG. 8, when the steering state is in the wheel holding state, the steering gain calculating map sets a characteristic line Lh so as to maintain a preset gain KOh, regardless of what value the motor angular velocity $\omega$ has.

Additionally, when the steering state is in the wheel over-turning state, a preset gain KOi larger than the preset gain KOh is maintained from zero to a preset value $\omega 1$. When the motor angular velocity $\omega$ exceeds the preset value $\omega 1$, the characteristic line L1 is set so that the gain increases with a relatively large slope in accordance with an increase in the motor angular velocity $\omega$.

Furthermore, when the steering state is in the wheel turning-back state, a preset gain KOd smaller than the preset gain KOh is maintained from zero to the preset value $\omega 1$, and the characteristic line Ld is set so that the gain decreases with a relatively small slope in accordance with an increase in the motor angular velocity $\omega$.

The vehicle speed gain adjusting part 37 includes a vehicle speed sensitive gain calculating part 37A to calculate a vehicle speed sensitive gain K1, and a gain multiplying part 37B to multiply the vehicle speed sensitivity gain K1 calculated by the vehicle speed rotation gain calculating part 37A by the gain doubling command Iref21 output from the steering state gain adjusting part 36 and output a gain doubling command Iref22.

Figure 9:
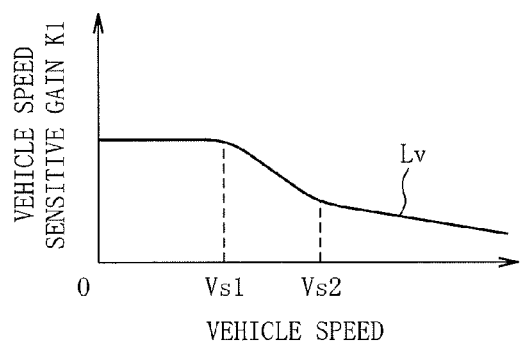
FIG. 9 is a characteristic diagram showing a vehicle speed sensitive gain calculating map applied to the vehicle speed sensitive gain setting part.

The vehicle speed gain calculating part 37A calculates the vehicle speed sensitive gain K1, by referring to the vehicle sensitive gain calculating map shown in FIG. 9, based on the input vehicle speed Vs. Herein, as shown in FIG. 9, the characteristic line Lv of the vehicle speed sensitive gain calculating map is set so that a predefined value Kv is maintained when the vehicle speed Vs is between zero and a predefined value Vs1, the gain decreases with a relatively large slope in accordance with an increase in the vehicle speed Vs when the vehicle speed exceeds the predefined value Vs1, and the gain decreases with a relatively small slope in accordance with an increase in the vehicle speed Vs when the vehicle speed exceeds a predefined value Vs2 greater than the predefined value Vs1.

The self-aligning torque gain adjusting part 38 includes a self-aligning torque gain calculating part 38A to set a correction gain K2 by calculating a self-aligning torque computation value SATo, and a gain multiplying part 38B to multiply self-aligning torque gain K2 set by the self-aligning torque gain calculating part 38A by the gain doubling command Iref22.

Figure 10:
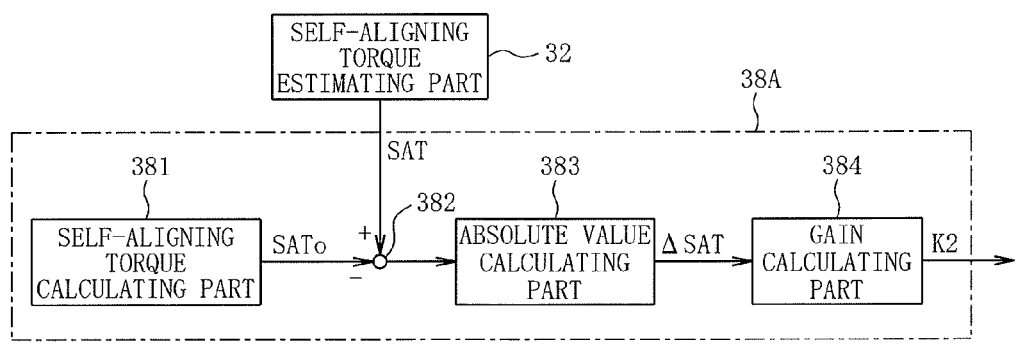
FIG. 10 is a block diagram showing a specific configuration of the self-aligning torque gain calculating part.

As shown in FIG. 10, the self-aligning torque gain calculating part 38A includes a self-aligning torque calculating part 381, a subtracter 382, an absolute value calculating part 383, and a gain calculating part 384.

The self-aligning torque calculating part 381 calculates the self-aligning torque calculating part SATo using a vehicle model, based on the four-wheel wheel driving rotation speeds VwFL to VwRR input from the four-wheel rotation speed sensor 18 and the motor angle $\theta$.

The subtracter 382 subtracts the self-aligning torque calculating value SATo calculated by the self-aligning torque calculating part 381 from the self-aligning torque estimated value SAT estimated by the above-mentioned self-aligning torque estimating part 32.

The absolute value calculating part 383 calculates a self-aligning torque deviation $\Delta SAT(=|SAT-SATo|)$ by transferring a subtracted output from the subtracter 382 into an absolute value. The self-aligning torque gain calculating part 384 calculates a self-aligning torque gain K2, by referring to the self-aligning gain calculating map shown in FIG. 11, based on the self-aligning torque deviation SAT calculated by the absolute value calculating part 383.

Here, the self-aligning torque calculating part 381 calculates an average value of the four-wheel rotation speeds VwFL to VwRR as the vehicle speed Vs, and in addition, substitutes vehicle various factor constants in an equation of motion (state equation) in a vehicle lateral direction serving as a vehicle model expressed by the following equation (2), with the motor angle θ as an estimated steering angle θ, and then calculates the self-aligning torque calculated value SATo by use of a self-aligning torque calculated value calculation expression (output expression) as represented by the following expression (3).

$$\begin{bmatrix} \beta' \\ \gamma' \end{bmatrix} = \begin{bmatrix} a_{11} & a_{12} \\ a_{21} & a_{22} \end{bmatrix} \begin{bmatrix} \beta \\ \gamma \end{bmatrix} + \begin{bmatrix} b_{11} \\ b_{21} \end{bmatrix} \delta_f \quad (2)$$

$$a_{11} = -\frac{2(K_f + K_r)}{mV}$$

$$a_{12} = -1 - \frac{2(l_f K_f - l_r K_r)}{mV^2}$$

$$a_{21} = -\frac{2(l_f K_f - l_r K_r)}{I}$$

$$a_{22} = -\frac{2(l_f^2 K_f + l_r^2 K_r)}{IV}$$

$$b_{11} = \frac{2K_f}{mV}$$

$$b_{21} = \frac{2l_f K_f}{I}$$

Vehicle Various Factor Constants
m: vehicle mass
I: vehicle inertia moment
lf: distance between center of gravity and front shaft
lr: distance between center of gravity and rear shaft
Kf: cornering power of front wheel tire
Kr: cornering power of rear wheel tire
V: vehicle speed
N: overall steering angle
θ: estimated steering angle
δf: actual steering angle (δf=θ/N)
β: sideslip angle at center of gravity of vehicle
γ: yaw rate
ε: trail $$SATo = \begin{bmatrix} c_{11} & c_{12} \end{bmatrix} \begin{bmatrix} \beta \\ \gamma \end{bmatrix} + [d_{11}]\delta_f \quad (3)$$

$$c_{11} = -2\varepsilon K_f$$

$$c_{12} = -\frac{2\varepsilon K_f l_f}{V}$$

$$d_{11} = 2\varepsilon K_f$$

Figure 11:
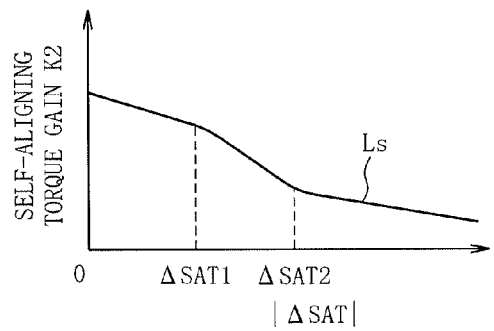
FIG. 11 is a characteristic diagram showing a self-aligning torque gain calculating map applied to the self-aligning torque gain calculating part.

In the gain calculating part 384, the self-aligning torque gain K2 is calculated, by referring to the self-aligning torque gain calculating map shown in FIG. 11, based on an absolute value |ΔSAT| of the self-aligning torque deviation output from the absolute value calculating part 383.

Here, as shown in FIG. 11, the characteristic line Ls of the self-aligning torque gain calculating map is set so that the self-aligning torque gain k2 decreases with a relatively gentle slope in accordance with an increase in the absolute value |ΔSAT| of the self-aligning torque deviation, when the absolute value |ΔSAT| of the self-aligning torque deviation is between zero and a preset value ΔSAT1.

In the characteristic line Ls, the self-aligning torque gain K2 decreases with a relatively steep while the absolute value |ΔSAT| of the self-aligning torque deviation falls within the range where the absolute value |ΔSAT| exceeds the preset value ΔSAT' and reaches a preset value ΔSAT2.

Moreover, in the characteristic line Ls, the self-aligning torque gain K2 decreases with a relatively gentle slope in accordance with an increase in the absolute value |ΔSAT| of the self-aligning toque deviation when the absolute value |ΔSAT| exceeds the preset value SAT2.

The driving wheel slip gain adjusting part 39 includes a driving wheel slip estimating part 39A to set a driving wheel slip gain K3 based on the wheel rotation speeds VwL, VwR detected by the wheel rotation speed sensor 18, and a gain multiplying part 39B to multiply the driving wheel slip gain K3 set by the driving wheel slip estimating part 39A by a gain doubling command Iref23.

Figure 12:
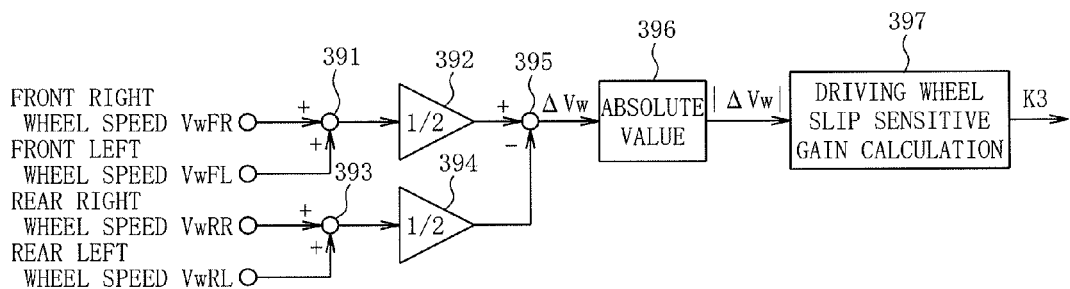
FIG. 12 is a block diagram showing a specific configuration of the driving wheel slip gain setting part.

As shown in FIG. 12, the driving wheel slip estimating part 39A receives the left and right wheel rotation speeds VwFL, VwFR of the front wheels detected by the wheel rotation speed sensor 18 and the left and right wheel rotation speeds VwRL, VwRR of the rear wheels.

The driving wheel slip estimating part 39A includes an adder 391, a multiplier 392, an adder 393, a multiplier 394, subtracter 395, an absolute value circuit 396, and a gain calculating part 397.

The adder 391 adds the left and right wheel speeds VwFL, VwFR of the front wheels. The multiplier 392 calculates an average value VwF of the front wheels by multiplying an added output from the adder 391 by ½. The adder 393 calculates the left and right wheel speeds VwRL, VwRR of the rear wheels.

The multiplier 394 calculates an average value VwR of the rear wheels by multiplying an added output from the adder 393 by ½. The subtractor 395 calculates a driving wheel rotation speed deviation ΔVw by subtracting the average value VwR of the rear wheels output from the multiplier 394 from the average value VwF of the front wheels output from the multiplier 392.

The absolute value circuit 396 changes the driving wheel rotation speed deviation ΔVw output from the subtractor 395 to an absolute value. The gain calculating part 397 calculates a driving wheel slip sensitive gain K4 based on the absolute value |ΔVw| of the driving wheel rotation speed deviation output from the absolute value circuit 396.

Figure 13:
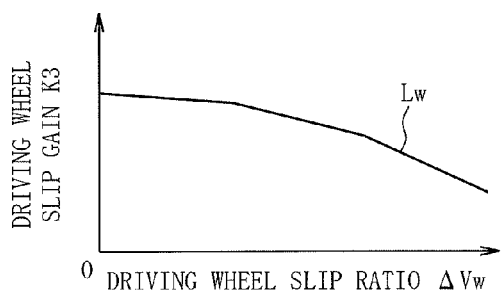
FIG. 13 is a characteristic diagram showing a driving wheel slip gain calculating map applied to the driving wheel slip gain setting part.

Here, the gain calculating part 397 calculates the driving wheel slip sensitive gain K3, by referring to the driving wheel slip sensitive gain calculating map shown in FIG. 13, based on the absolute value |ΔVw| of the input driving wheel rotation speed deviation ΔVw. As shown in FIG. 13, the driving wheel slip sensitive calculating map is set by a poly-line characteristics line Lw such that the driving wheel slip gain K3 gradually decreases in accordance with an increase in the absolute value |ΔVw| of the driving wheel rotation speed deviation ΔVw from 0.

In addition, the torque limiting part 32C includes a control output limiting value calculating part 40, and a limiter 41 to limit a gain double command Iref24 with an output limiting value Lim calculated by the control output limiting value calculating part 40 to output the second steering assist command Iref2.

Figure 14:
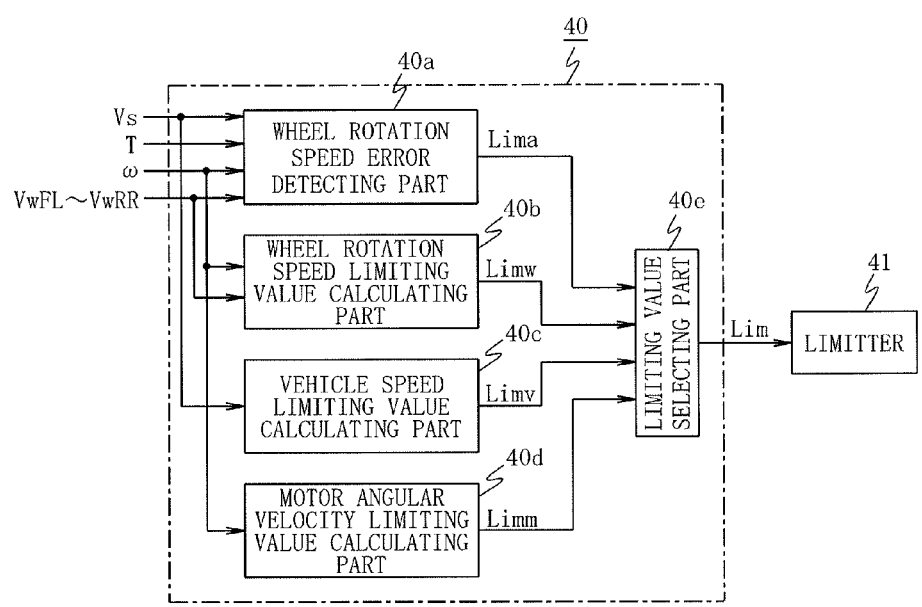
FIG. 14 is a block diagram showing a specific configuration of a control output limiting value calculating part.

The output limiting value calculating part 40 receives the vehicle speed Vs, the steering torque T, the motor angular velocity ω, the four-wheel wheel rotation speeds VwFL to vwRR. As shown in FIG. 14, the output limiting value calculating part 40 includes a wheel rotation speed error detecting part 40a, a wheel rotation speed limiting value calculating part 40b, a vehicle speed limiting value calculating part 40c, and a motor angular velocity limiting value calculating part 40d.

Figure 15:
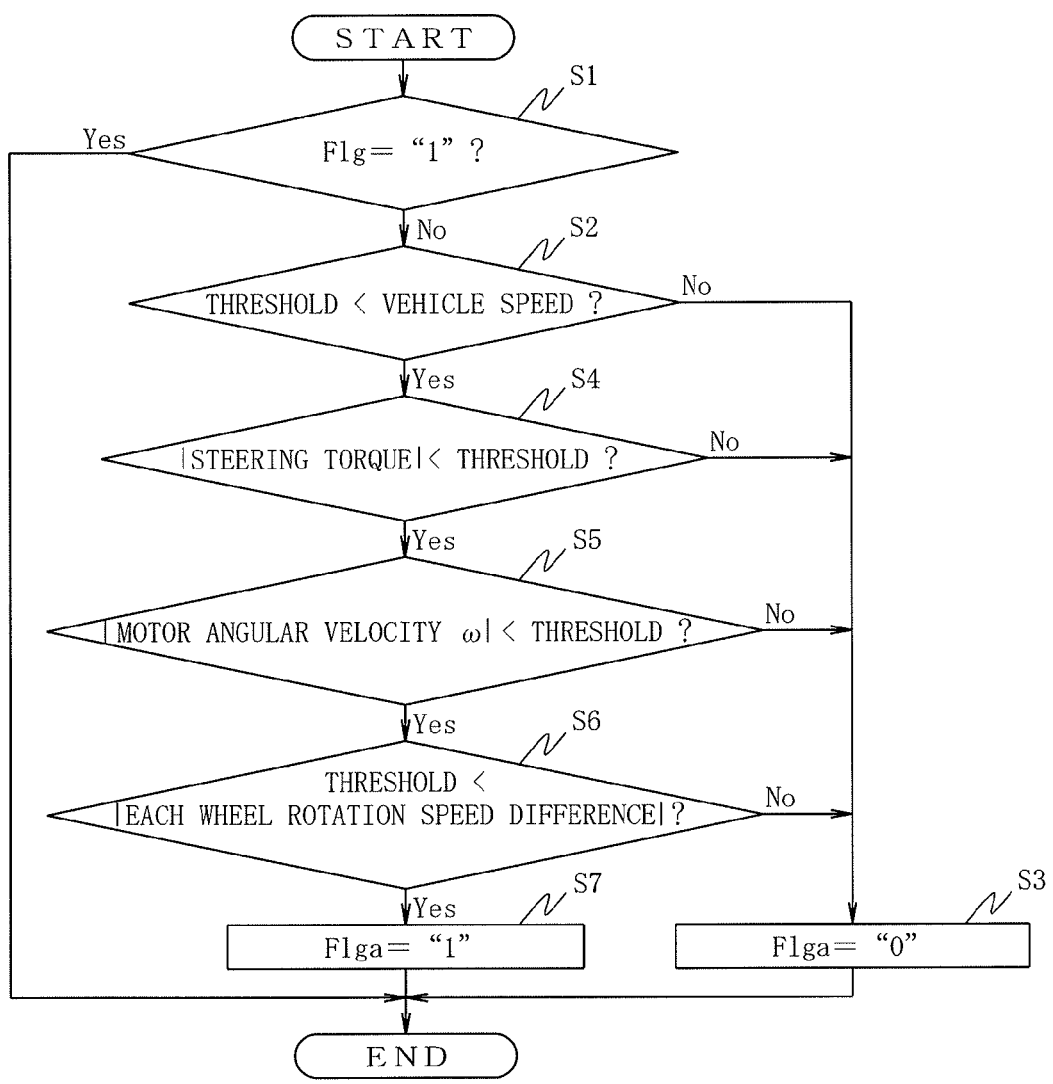
FIG. 15 is flowchart showing an example of a wheel rotation speed error detecting unit executed by the wheel rotation speed error detecting unit shown in FIG. 14.

The wheel rotation speed error detecting part 40a detects whether an error of the four-wheel rotation speed sensor 18 based on the vehicle speed Vs, the steering wheel torque T, the motor angular velocity ω, and the four-wheel rotation speeds VwFL, VwFR, VwRL, and VwRR. When an error is detected, an error limiting value Lima of "0" is set. In other words, in the wheel rotation speed error detecting part 40a, a wheel rotation speed error detecting process shown in FIG. 15 is executed.

In this wheel rotation speed error detecting process, firstly, at step S1, a determination is made on whether or not a torque sensor error detecting flag Flg, indicating the occurrence of an error in the steering torque sensor 14, is set to "1" by a torque sensor error detecting process mentioned later. If the torque sensor error detecting flag Flg is set to "1", then the wheel rotation speed error detecting process is determined to have low reliability, and terminates the processing without change.

On the other hand, if the torque sensor error detecting flag Flg is set to "0", the processing proceeds to step S2, to determine whether or not the wheel speed Vs exceeds a threshold Vss which is set to a speed with which a straight driving state of a vehicle may be determined. If Vs≤Vss, it is determined that an error determination cannot be made, then the processing proceeds to step S3.

In step S3, where the torque sensor error detecting flag Flg is set to "0" representing that there is no error in the wheel rotation velocity, and in addition, the wheel rotation speed calculating value Lima is set to a maximum value Limamax not limiting the gain doubling torque command Iref2. The error determination processing terminates after the maximum value Limamax is output to the limiting value selecting part 40e.

Specifically, if Vs>Vss, it is determined that the straight driving state is determinable, and the processing proceeds to step S4.

At step S4, it is determined whether or not the absolute value of the steering torque T is less than a threshold Ts with which straight driving state of the vehicle is determinable. If T≥Ts, a determination is made that the steering torque T is large and stays in the steering state or in the wheel holding state, so the error determination cannot be made, and the processing proceeds back to step S3. If T<Ts, a determination is made to have a high possibility in which the vehicle is in the straight driving state, and the processing proceeds to step S5.

At step S5, a determination is made whether the absolute value of the motor angular velocity ω is smaller than a threshold ωs with which the straight driving state of the vehicle is determinable. If ω≥ωs, it is determined that the error determination cannot be made, and the processing proceeds back to step S2. Otherwise, if ω<ωs, it is determined that the vehicle is in the straight driving state, and the processing proceeds forward to step S6.

At step S6, a determination is made on whether or not the absolute values of the left and right rotation speed differences ΔVwF, ΔVwR in the back and forth of each of the wheel rotation speeds VwFL to VwRR exceed the predefined threshold ΔVws.

If the determination results satisfies ΔVwF ΔVws and ΔVwR≥ΔVws, it is determined that the wheel rotation speeds VwFL to VwRR are normal, and the processing proceeds back to step S3. Otherwise, if ΔVwF>ΔVws or ΔVwR >ΔVws, it is determined that a tire with the different diameter such as a temper tire is mounted to one of the four wheels or the vehicle rotation speed sensor itself is erroneous, and an error is occurring in any of the wheel rotation speeds VwFL to VwRR, and the processing proceeds to step S7.

At step S7, the error determination flag Flaga, indicating the occurrence of error in the wheel rotation speed, is set to "0", the wheel rotation speed limiting value lima is set to "0", and the processing terminates after it is output to the limiting value selecting part 40e.

In the processing shown in FIG. 15, the processing in step S2, and step S4 to step S6 correspond to the wheel rotation speed error detecting unit. The processing in step S7, the limiting value selecting part 40e, and the limiter 41 correspond to the emergency command limiting part.

Further, the front wheel rotation speed limiting value calculating part 40b is, for example, taking a rear drive vehicle as a target, for detecting an error of the wheel rotation speed due to disturbance, such as the case where the vehicle travels, so-called, on a split μ road, one of which is a low friction coefficient road such as a snow-covered road or a frozen road, and the other of which is a high friction coefficient road such as a dry road, based on the motor angular velocity ω and the wheel rotation speeds VwFL to VwRR. The wheel rotation speed limiting value calculating part 40b executes a wheel rotation speed limiting value calculating process shown in FIG. 16.

Figure 16:
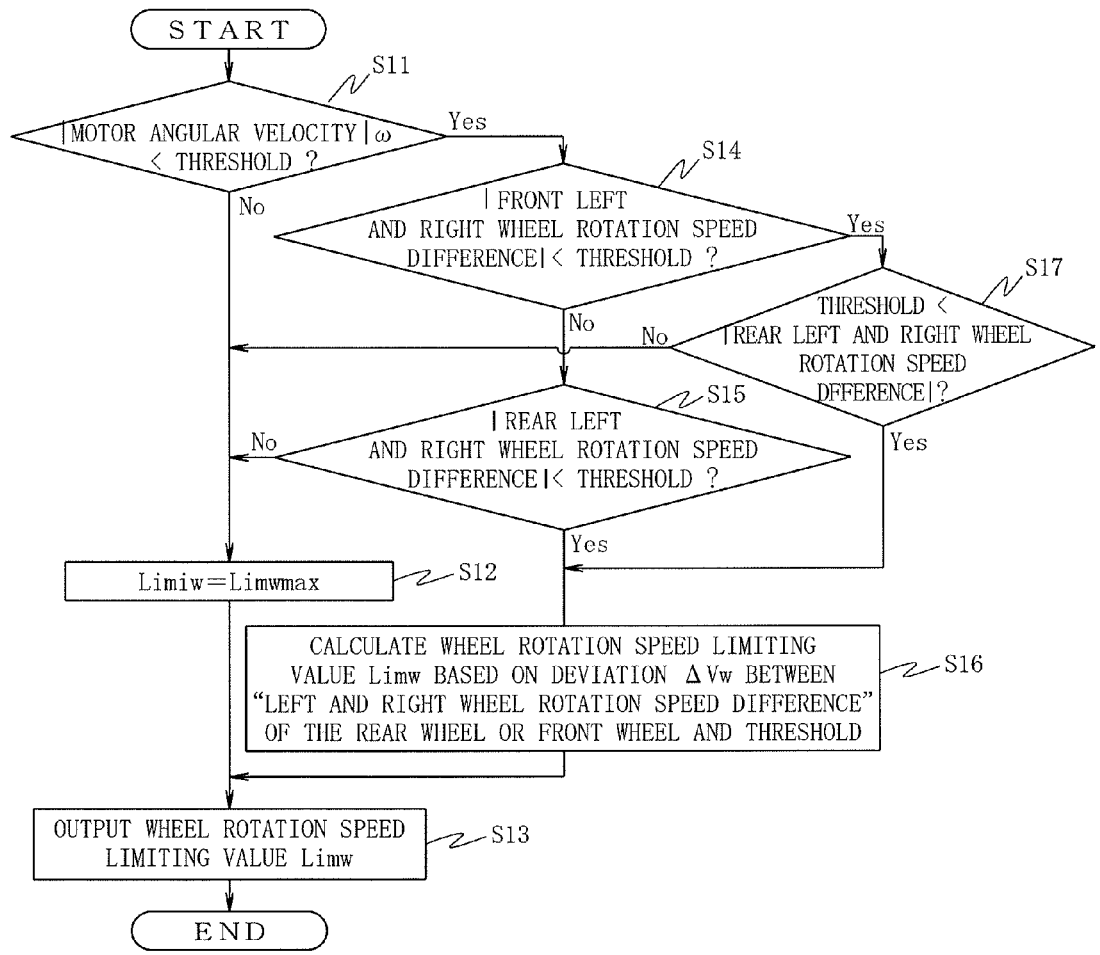
FIG. 16 is a flowchart showing an example of a wheel rotation speed limiting value calculating procedure executed by the wheel rotation speed limiting value calculating part shown in FIG. 14.

As shown in FIG. 16, the wheel rotation speed limiting value calculating process is executed as timer interrupt processing invoked every preset time (e.g., 1 msec). In the wheel rotation speed limiting value calculating process, first of all, at step S11, a determination is made whether or not the absolute value of the motor angular velocity is smaller than a threshold ωs2 with which a steering state of the steering wheel 1 is determinable. If |ω|≤ωs2, since it is determined that the steering wheel 1 is in the steering state and an error determination of the wheel rotation speed cannot be made, the wheel rotation speeds VwFL to VwRR are determined normal, and the processing proceeds to step S12.

At step S12, a wheel rotation speed limiting value Limw is set to the maximum value Limwmax and then the processing proceeds to step S13, where the set wheel rotation speed limiting value Limw is output to the limiting value selecting part 40e. After that, the timer interrupt process is terminated, and the processing returns to a given main program.

When the determination result at step S11 shows that the absolute value of the motor angular velocity ω is smaller than a threshold ω2, the processing proceeds to step S14, where a determination is made whether or not the left and right wheel rotation speed difference ΔVwF of the font wheels that are driven wheels is smaller than a threshold ΔVwFs2 used for determining whether the vehicle is in the wheel holding state. If the determination result satisfies |ΔVwF|≥ΔVwFs2, it is determined that the steering wheel 1 is in the wheel holding state having an inner and outer wheel rotation speed difference, and the processing proceeds to step S15.

At step S15, a determination is made that the absolute value of the left and right wheel rotation speed difference ΔVwR of the rear wheels that are driving wheels is smaller than a threshold ΔVwRs2 used for determining an error caused by a disturbance. If the determination result satisfies |ΔVwR|ΔVwR2, it is determined that the absolute value of the left and right wheel rotation speed difference ΔVwR is larger also at the rear wheels. It is also determined to be in the wheel holding state having an inner and outer wheel speed difference and each of the wheel rotation speeds VwFL to WwRR is normal, and the processing proceeds to step S12.

The determination result at step S15 shows that the absolute value of the left and right wheel rotation speed difference ΔVwR of the rear wheels is smaller than the threshold ΔVwRs2. A determination is made that the wheel rotation speed is changed due to the disturbance, such as in the case where either of the wheel rotation speeds VwRL or VwRR of the rear wheels is traveling e.g. on the above-mentioned split μroad, and the processing proceeds to step S16.

Figure 17:
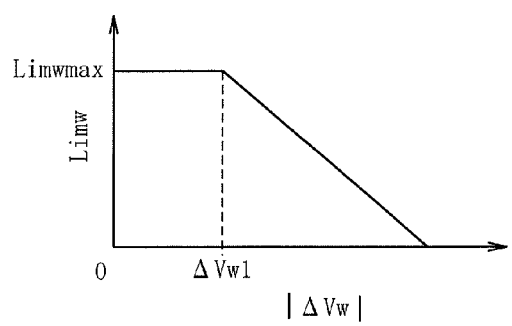
FIG. 17 is a characteristic diagram showing a wheel rotation speed limiting value calculating map used in FIG. 16.

At step S16, the wheel rotation speed limiting value Linw is calculated, by referring to the wheel rotation speed limiting value calculating map shown in FIG. 17, based on the left and right wheel rotation speed differences ΔVwR of the rear wheels and the threshold ΔVwRs2, or the absolute value of a deviation Δvw between the left and right wheel rotation speed difference ΔVwF of the front wheels and the threshold ΔVwFs2, and then the processing proceeds to step S13.

Here, as shown in FIG. 17, the wheel rotation speed limiting value calculating map is represented by a characteristic drawing in which the absolute value of the left and right wheel rotation speed difference ΔVw is taken as a horizontal axis and the wheel rotation speed limiting value Limw is taken as a vertical axis. The polygonal characteristic line Lw is set such that the wheel rotation speed limiting value Limw maintains the maximum value Limwmax where the wheel rotation speed difference ΔVw does not limit a control output while the absolute value of the left and right wheel rotation speed difference ΔVW falls within the range from "0" to the preset value ΔVwL. When the absolute value of the left and right rotation speed limiting value Limw exceeds the preset value ΔVwl, the wheel rotation speed limiting value Limw gradually decreases from the maximum value Limwmax in accordance with an increase in the absolute value of the left and right wheel rotation speed difference ΔVw, and then eventually coming to "0".

Specifically, the determination result at step S14 shows that the absolute value of the left and right wheel rotation speed difference ΔVwF of the front wheels that are driven wheels is smaller than the threshold ΔVwFs2, it is determined that the vehicle is in the straight driving state, and the processing proceeds to step S17.

At step S17, a determination is made whether or not the absolute value of the left and right wheel rotation speed difference ΔVwR of the rear wheels exceeds the threshold ΔVwRs2 used for determining an error due to disturbance. In this determination result, if the absolute value of the left and right rotation speed difference ΔVwF is smaller than the threshold ΔVwRs2, it is determined that the vehicle is in the normal state where no change is occurring in the wheel rotation speed due to a disturbance, and the processing proceeds to step S12.

The determination result at step S17 shows that the absolute value of the eight and left rotation speed difference ΔvwR of the rear wheels exceeds the threshold ΔvwRs2, it is determined that at least one of the wheel rotation speeds ΔwRL, VwRR of the rear wheels is affected by the disturbance, and the processing proceeds back to step S16.

At the processing shown in FIG. 16, the processing at step S11, S14, S15, and S17 correspond to the wheel rotation speed error detecting unit, and the processing at step S16, the limiting value selecting part 40e, and the limiter 41 correspond to the emergency command limiting unit.

Figure 18:
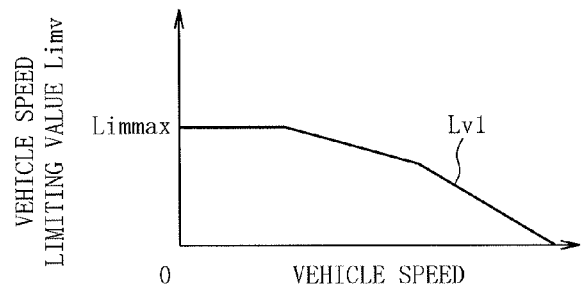
FIG. 18 is a characteristic diagram showing a vehicle speed limiting value calculating map used in the vehicle speed limiting value calculating part shown in FIG. 14.

The wheel limiting value calculating part 40c calculates the wheel speed limiting value Limx, by referring to the wheel limiting value calculating map shown in FIG. 18, based on the wheel speed Vs.

Herein, as shown in FIG. 18, the vehicle speed calculating map is represented by a polygonal characteristic line Lv1 in which the maximum limiting value Limmax is maintained within the range the vehicle speed Vs reaches the preset value Vs from zero, and when the vehicle speed Vs exceeds the prescribed value Vs3, the vehicle speed limiting value limy gradually decreases in accordance with an increase in the vehicle speed Vs. When the vehicle speed Vs further exceeds the preset value Vs4, the vehicle speed limiting value limy decreases by a large amount.

Figure 19:
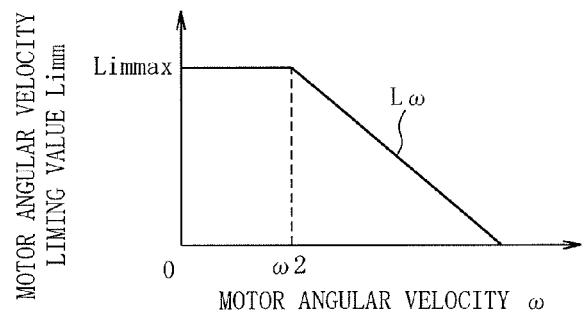
FIG. 19 is a characteristic diagram showing a motor angular velocity limiting value calculating map used in the motor angular velocity limiting value calculating unit shown in FIG. 14.

The motor angular velocity limiting value calculating part 40d calculates a motor angular velocity limiting value Limm, by referring to the motor angular velocity limiting value calculating map shown in FIG. 19, based on the motor angular velocity ω.

Here, as shown in FIG. 19, the motor angular velocity limiting value calculating map is represented by a characteristic line Lω in which the maximum value Limmax is maintained within the range where the motor angular velocity ω reaches the set angular velocity ω2 produced by a drive steering or due to a road surface reaction force from zero, when the motor angular velocity ω exceeds the set angular velocity ω2, the motor angular velocity limiting value Limm decreases with a relatively steep slope in accordance with an increase in the motor angular velocity ω.

In addition, when an error limiting value Lima is input, the limiting value selecting part 40e outputs the error limiting value Lima to the limiter 41 as a limiting value Lim. When the error limiting value Lima is not input, the limiting value selecting part 40e makes a comparison among the wheel rotation speed limiting value Limw, the vehicle speed limiting value Limv, and the motor angular velocity Limm, and the smallest value is output as a control output limiting value Lim to the limiter 41.

Figure 20:
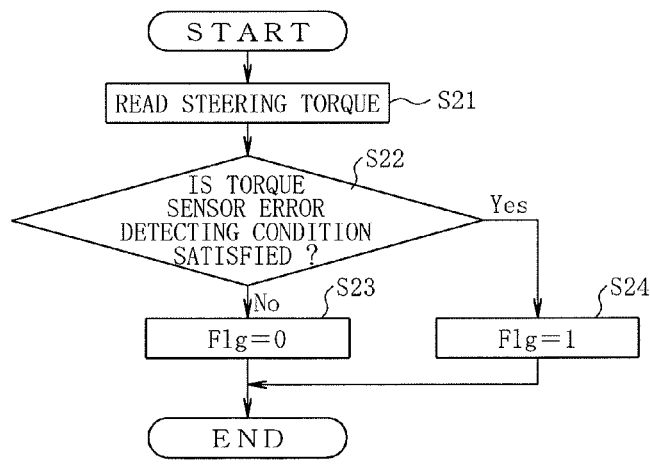
FIG. 20 is flowchart showing an example of a torque sensor error detection procedure executed by a torque sensor error detecting unit shown in FIG. 2.

Furthermore, the torque sensor error detecting part 33 receives the steering torque T detected by the steering torque sensor 14, and executes a torque sensor error detecting process shown in FIG. 20 based on the steering torque T.

The torque sensor error detecting process is executed as a timer interrupt processing invoked every preset time (e.g. 1 msec). In the torque sensor error detecting process, firstly, at step S21, the processing reads in the steering torque T detected by the steering torque sensor 14, and secondly, the processing proceeds to step S22, where a determination is made on whether or not the steering torque read in step S21 satisfies steering torque sensor error detection condition.

The steering torque sensor error detecting condition involves a case where a state that does not change over a given time continues during driving of a vehicle, a case where a state that the steering torque T more than a preset error threshold due to powering continues over a given time, a case where a state that the steering torque T less than a preset error threshold due to earth fault continues over a given time, or the like.

Then, the determination result at step S22 shows that if the result does not satisfy the torque sensor error detection conditions i.e. the steering torque sensor 14 is normal, then the processing proceeds to step S23. The torque sensor error detecting flag Flg is set to "0", and then the timer interrupt processing is terminated and the processing return to a given main program.

On the other hand, if the determination result at step S22 satisfies the torque sensor error detecting condition i.e. the steering torque sensor 14 is abnormal, then the processing proceeds to step S24. The torque sensor error detecting flag Flg is set to "1", and then the timer interrupt processing is terminated and the processing returns to a given main program.

Moreover, when the torque sensor error detecting flag Flg to be set by the torque sensor error detecting part 33 is reset to "0", the command selecting part 34 selects the first steering assist command Iref1 calculated by the above-mentioned first steering assist torque command calculating part 31.

In addition, if the torque sensor error detecting flag Flg is set to "1", the command selecting part 34 selects the second steering assist commend Iref2 calculated by the second torque command calculating part 32.

Furthermore, the command selecting part 34 sets the selected first torque command Iref1 or the second torque command Iref2 as a torque command Iref to supply to the rate limiter 35, where the torque command is output to an adder 46, to be described later, after being suppressed an abrupt change of the torque commend Iref.

The command compensating part 22 includes at least a convergence compensating part 43 to compensate a convergence of the a yaw rate based on the motor angular velocity ω calculated by the motor angular velocity calculating part 201 of the rotation information calculating part 20, and an inertia compensating part 44 to prevent a degradation of an inertia or control responsiveness by compensating a torque equivalent value caused by an inertia of the electric motor 12 based on the motor angular velocity ω calculated by the motor angular acceleration calculating part 202 of the rotation information calculating part 20.

Here, the convergence compensating part 43 receives the motor angular velocity ω calculated by the motor angular velocity calculating part 201, and calculates a convergence compensation value Ic by multiplying a convergence control gain Kc by the motor angular velocity ω, so as to brake against a twisting and rotating operation of the steering wheel 1, for the sake of improving the convergence of yaw of the vehicle.

Then, the inertia compensation value Ii calculated by the inertia compensating part 44 and a convergence compensation value Ic calculated by the convergence compensating part 43 are added by an adder 45 to calculate a command compensation value Icom. The commend compensation value Icom is added to the steering assist torque command Iref output from the steering assist torque command calculating part 21, described above, to calculate a compensated steering assist torque command Iref'. The compensated steering assist torque command Iref' is output to the motor driving circuit 24.

An explanation will next be made to an operation of the first embodiment.

Now, let us suppose that the steering torque sensor 14 is in the normal state. The steering torque T detected by the steering torque sensor 14 in the torque sensor error detecting part 33 provided in the steering assist command calculating part 21 does not satisfy the torque sensor error condition. For this reason, the torques sensor error detecting flag Flg is set to "0", and the torques sensor error detecting flag Flg is output to the command selecting part 34.

On that account, the command selecting part 34 selects the first steering assist torque command calculating part 31 and variations of the first steering assist torque command Iref1 output from the front steering torque command calculating part 31 is limited by the rate limiter 35, and it is output as a steering assist command Iref to the adder 23.

At this moment, it is assumed that a vehicle is stopped with the steering wheel 1 as a neutral position in the straight driving state. At this state, when the steering wheel 1 is not steered, the steering torque T detected by the steering torque sensor 14 is "0", and the vehicle speed is also "0". Thus, when the torque command calculating part 311 of the first steering assist torque command calculating part 31 refers to the steering assist torque command calculating map based on the steering torque T and the vehicle speed Vs, the steering assist torque commend Irefb comes to "0" and the first steering assist commend Iref1 comes to "0" as well.

At this time, since the electric motor 12 is also stopped, the motor angular velocity ω calculated by the motor angular velocity calculating part 201 of the motor rotation information calculating part 20 and the motor angular acceleration α calculated by the motor angular acceleration calculating part 202 are both "0". Thus, the convergence compensation value Ic calculated by the convergence compensating part 43 and the inertia compensation value Ii calculated by the inertia compensating part 44 come to "0". Therefore, the commend compensation value Icom comes to "0" and the compensated steering assist torque command Iref' output from the adder 23 comes to "0" as well.

Consequently, a motor driving current output from the motor driving circuit 24 continuously outputs "0" and thus the electric motor 12 keeps a stop state.

In the stop state of the vehicle, when trying to steer the steering wheel to, a so-called stationary steering, the steering torque T detected by the steering torque sensor 14 may have a relatively large value in response thereto.

Thereby, the steering assist torque command Iref1 calculated by the first steering assist torque command calculating part 31 suddenly increases in accordance with the steering torque T.

Even in this state, because the electric motor 12 is stopped, the motor angular velocity ω and the motor angular acceleration a continuously maintain "0". Similarly, the convergence compensation value Ic calculated by the convergence compensating part 43 of the command compensating part 22 and the inertia compensation value Ii calculated by the inertia compensating part 44 continuously maintains "0" and hence the command compensation value Icom comes to "0" as well.

Because of this, the steering assist torque command Iref is output, as it is, as a compensated steering assist torque command Iref, from the adder 23 to the motor driving circuit 24.

Accordingly, the motor driving current Iref'' in proportion to the compensated steering assist torque command Iref' is output from the motor driving circuit 24 to the electric motor 12, and the electric motor 12 is rotationally driven to generate a steering assist force in proportion to the steering torque T.

The steering assist force generated by the electric motor 12 is transmitted to the steering shaft 2 to which a steering force is transmitted from the steering wheel 1 through the decelerating mechanism 11. Accordingly, the steering force and the steering assist force are converted into a liner motion in a vehicle width direction by the steering gear mechanism 8. The left and right turning wheels WL, WR are turned through the tie rod 9, thereby steering the left and right turning wheels WL, WR with a light steering torque.

Driving control the electric motor 12 increases the motor angular velocity ω calculated by the motor angular velocity calculating part 201 the rotation information calculating part 20 and the motor angular acceleration a calculated by the motor angular acceleration calculating part 202. Thereby, the command compensating part 22 calculates the convergence compensation value Ic and the inertia compensation value Ii and they are added to calculate the command compensation value Icom. By supplying the calculated command compensation value Icom to the adder 46, the commend compensation value Icom is added to the steering assist torque command Iref to calculate the compensated steering assist torque command iref'.

In this way, the command compensating part 22 performs command compensation processing, and in addition, the center responsiveness improving part 313 of the first steering assist torque command calculating part 31 differentiates the steering torque T to ensure stability in the assist characteristics dead zone and to compensate a static friction. The phase compensating part 312 performs a phase compensation to the first steering assist command Iref1.

Moreover, when the vehicle is started, the steering assist torque command Irefb calculated by the torque command calculating part 311 in the first steering assist torque command calculating part 31 decreases with an increase in the vehicle speed Vs detected by the vehicle speed sensor 16. Thus, the optimum steering assist torque command Iref1 is set according to a driving condition of the vehicle, thereby allowing an optimum steering assist control in accordance with the driving condition of the vehicle.

In the course of executing the optimum steering assist control, the wheel rotation speed error detecting part 40a of the control output limiting value calculating part 40 detects an error of the four-wheel rotation speed sensor 18. In the wheel rotation speed error detecting part 40a, when the straight driving conditions of the vehicle are satisfied, in which the vehicle speed Vs is more than or equal to the threshold Vss, the absolute value of the steering torque T is smaller than the threshold Ts, and the absolute value of the motor angular velocity ω is smaller than the threshold ωs, a determination is made on whether or not the absolute values of the left and right rotation speed difference ΔVwF and ΔVwR of each of the rotation speeds VwFL to VwRR exceeds the thresholds ΔVwFs, ΔVwRs. If the determination result satisfies |ΔVwF|<ΔVwFs and |ΔVwR|<ΔVwRs, i.e. each of the wheel rotation speeds VwFL to VwRR is VwFL≈VwFR≈VwRL≈VwRR, it is determined that each of the wheel rotation speeds VwFL to VwRR is normal, and a wheel rotation speed error flag Flgw is reset to "0".

On the other hand, when the absolute value of the rotation speed difference ΔVwF (or ΔVwR) exceeds the threshold ΔVwFs (or ΔVwRs), a possibility could be considered that a rotation speed difference occurs caused by a tire with a different diameter, such as a temper tire, is mounted on any one of the left and right wheels, or a defect occurs in the wheel rotation speed itself. In this case, the wheel rotation speed error flag Flgw is set to "1" by judging that the detected wheel rotation speeds VwFL to VwRR are not reliable.

However, even when the wheel rotation speed error flag Flgw is set to "1", when the steering torque sensor 14 is normal, there is no possibility that the second steering assist torque command calculating part 32 to calculate the self-aligning estimation value SAT by use of the wheel rotation speeds VwFL to VwRR is selected. Therefore, the optimum steering assist control will be continued.

Nevertheless, while the vehicle is being driven, the steering torque sensor 14 falls into an error condition, and when the steering torque T satisfies the error detection condition, the torque sensor error detecting flag Flg is set to "1" by the torque sensor error detecting part 33. Thus, the command selecting part 34 selects the second steering assist torque command calculating part 32, instead of the aforesaid first steering torque assist command calculating part 31.

At this moment, when the wheel rotation speeds VwFL to VwRR output from the four-wheel rotation speed sensor 18 are detected to be normal by the wheel rotation speed error detecting part 40a of the control output limiting value calculating part 40, the wheel rotation speed error limiting value Lima output from the wheel rotation speed error detecting part 40a is set to the maximum value Limamx not limiting the control output.

In the second steering assist torque command calculating part 32, the wheel rotation speeds VwL, VwR of the left and right wheels Wl, WR are detected by the wheel rotation speed sensor 18L, 18R, respectively, and the detected wheel rotation speeds VwL, VwR are supplied to the self-aligning torque estimating part 32A. Therefore, the vehicle speed equivalent value Vs' is detected by the average value calculating part 324 of the self-aligning torque estimating part 32A. In addition, the equation (1) is calculated by the self-aligning torque initial estimating part 321 to calculate wheel rotation speed difference ΔVwF based on the wheel rotation speeds VwFL, VwFR of the front wheels. Based on the calculated wheel rotation speed difference ΔVwF, the self-aligning toque initial estimation value SATi is estimated by referring to the self-aligning torque calculating map shown in FIG. 4.

Then, the estimated self-aligning torque initial estimation value SATi is subjected to a low pass filtering process by the low pass filter 328 to produce a noise-reduced self-aligning torque initial estimation value SATi'. The self-aligning torque initial estimation value SATi' is subjected to phase compensation by the phase correction part 331 using the vehicle speed equivalent value Vs' to thereby calculate a self-aligning torque estimation value. Further, the gain K is multiplied to calculate the second steering assist torque command Iref2.

While the vehicle is being driven, when the vehicle is in the straight driving state, the self-aligning torque initial estimation value SATi also comes to "0", as the wheel rotation speed difference ΔVwF is "0". Thereby, the electric motor 12 maintains the stop state.

When transferring from the straight driving state to a turning-driving state by steering the steering wheel 1, a difference is generated between the left and right rotation speeds VwFL, VwFR depending on a turning radius in the turning-driving state. On that account, the wheel rotation speed difference ΔVwF becomes a relatively small value in the low vehicle speed Vs, as a difference between the left and right wheel rotation speeds VwL, VwR that are set to a numerator is extremely small. Therefore, the self-aligning torque initial estimation value SATi calculated by the self-aligning force initial estimating part 321, by referring to the self-aligning torque initial estimation map shown in FIG. 4 comesto a relatively small value.

The self-aligning initial estimation value SATi is subjected to the low pass filtering by the low pass filter 328, and is subjected to the phase correction by the phase correction part 331 using the vehicle equivalent value Vs'. This enables correct estimation of the self-aligning torque SAT input from a road surface to a rack shaft of the steering gear mechanism 8 while the vehicle is being driven.

Then, a gain adjusting process is applied to the estimated self-aligning torque estimation value SAT by the gain adjusting part 32B, and in addition, a torque liming process is applied by the torque limiting part 32C. Thereby, the second steering assist torque command Iref2 taking account of the self-aligning torque SAT is calculated.

The second steering assist torque command Iref2 is supplied via the command selecting part 34 and the rate limiter 35 to the adder 23. The compensated steering assist torque command Iref' obtained by adding the command compensation value Icom by the adder 23 is supplied to the motor driving circuit 24. As a result, the motor driving circuit 24 generates the steering assist force taking account of the self-aligning torque SAT, thereby continuing the steering assist control.

When the vehicle speed vs of the vehicle is fast, the wheel rotation speed difference ΔVwF becomes larger calculated by the following the equation (1), as the difference between the left and right wheel steering rotation speeds VwFL and VwFR get larger. In accordance therewith, a sideslip angle β calculated by the self-aligning torque initial estimation part 321, by referring to the sideslip angle calculating map may shown in FIG. 4, have a larger value. Therefore, the self-aligning torque initial estimation value SATi calculated by referring to the self-aligning initial estimation calculating map of FIG. 5 has a relatively larger value as well.

The self-aligning torque initial torque estimation value SATi is subjected to the low pass filtering by the low pass filter 328 and is subjected to the phase correction by the phase correction part 331 using the vehicle speed equivalent value Vs'. This enables correct estimation of the self-aligning torque SAT input from a road surface to a rack shaft the of steering gear mechanism 8 while the vehicle is being driven.

The estimated self-aligning torque estimation value SAT is subjected to gain adjustment by the gain adjusting part 32B and the torque is limited by the torque limiting part 32C. The second steering assist torque command Iref2 is calculated taking account of the self-aligning torque SAT. The second steering assist torque command Iref2 is supplied via the command selecting part 34 and the rate limiter 35 to the adder 23. Accordingly, the motor driving circuit 24 can generate a steering assist force taking account of the self-aligning torque SAT to continue the steering assist control.

According to the above first embodiment, when the steering torque sensor 14 falls into an error state, the self-aligning torque estimating part 32A estimates a reaction force from the road surface and calculates the necessary second steering assist torque command Iref2. The electric motor 12 is driven and controlled based on the second steering assist torque command Iref2.

This allows generation of a steering assist force at the electric motor 12 according to the reaction force from the road surface, whereby a steering assist control necessary for steering continues even after an error occurs at the steering torque sensor 14. Hence, as the reaction force from the road surface is taken into consideration, the optimum steering assist force may be generated depending on a change in steering angle φ even when the vehicle travels on roads, such as a low rainfall road, a frozen road, or a snow-covered road having a low speed surface friction coefficient.

In addition, the self-aligning torque initial estimation value SATi is calculated by use of the wheel rotation speed sensors 18RL, 18RR for use in another anti-lock braking system. This suppresses an increase in part counts, thus reducing the costs.

When the steering torque sensor 14 is in the normal state and the vehicle is in the straight driving state, however, if the wheel rotation speed error detecting part 40a in the aforementioned control output limiting value calculating part 40 detects mounting of a tire with a different diameter such as a temper tire or an error is occurring at at least one of the four-wheel rotation speed sensor 18, at least one of the wheel rotation speeds VwFL to VwRR output from the four-wheel rotation speed sensor 18 contains an error value. Because of this, the second steering assist torque command calculating part 32 uses these wheel rotation speeds VwFL to VwRR to calculate the self-aligning torque estimation command SAT. The gain of such a calculated self-aligning torque estimation value SAT is adjusted by the gain adjusting part 32B, but the reliability of the calculated second steering assist torque command Iref2 will decrease.

Thus, when an error of the wheel rotation speed sensor 18 is detected by the wheel rotation speed error detecting part 40a in the control output limiting value calculating part 40, the wheel rotation speed error limiting value limw is set to "0". Consequently, the wheel rotation speed error limiting value Limw of "0" is selected by the limiting value selecting part 40e, and is supplied to the limiter 41 as a limiting value Lim, whereby the second steering assist command Iref2 is limited by the limiter 41 to "0".

For that reason, only the command compensating value Icom is supplied to the motor driving circuit 24 from the torque command compensating part 22 in response to the driving state of the electric motor 12 until then. The rotation speed of the electric motor 12 decreases, and in accordance therewith the command compensation value Icom decreases. Hence, driving of the electric motor 12 is soon stopped and the steering assist control is stopped with this.

In this manner, when the steering torque sensor 14 is a normal state, the wheel rotation speed error detecting part 40a of the control output limiting value calculating part 40 detects an error of the wheel rotation speeds VwFL to VwRR detected by the four-wheel rotation speed sensor 18, every time the wheel is in the straight driving state. While the error of the rotation speeds VwFL to VwRR is detected, when an error of the steering torque sensor 14 is detected by the torque sensor error detecting part 33, the second steering assist torque command Iref2 calculated based on the wheel rotation speeds VwFL to VwRR is limited to "0". Thus, driving of the electric motor 12 is stopped, and the steering assist control is stopped.

Hence, it prevents the occurrence of self-steering and control error output, resulting from calculation of the second steering torque command Iref2, based on the erroneous wheel rotation speed.

Even through the four-wheel rotation speed sensor 18 is in the normal state, once a vehicle runs on the split μ road mentioned above, or the vehicle rotation speed is limited caused by the activation of the anti-lock braking system, the second steering assist torque command Iref2 will be affected even when the wheel rotation speeds VwFL to VwRR are temporarily changed due to the disturbance.

In this case, the wheel rotation speed limiting value calculating part 40b in the control output limiting value calculating part 40 executes at all times a wheel rotation speed limiting process shown in FIG. 16. At that time, when the vehicle is in the straight driving state and when the vehicle is in a regular circular turning state, an absolute value of the motor angular velocity ω is smaller than a threshold ωs2. Thus, in the wheel rotation speed limiting process shown in FIG. 16, the processing shifts from step S11 to step s14, and it is determined whether or not the absolute value of the left and right wheel rotation speed difference ΔVwF of the front wheels that are driven wheels is smaller than a threshold ΔVwFs2.

Here, if the absolute value of the left and right rotation speed difference ΔVwF of the front wheels is larger than or equal to the threshold ΔVwFs2, it is determined that the vehicle is in the regular circular turning state while in the wheel holding state, and the processing proceeds to step S15. As a determination result at step S15, if the left and right wheel rotation speed difference ΔVwR of the rear wheels is more than the threshold ΔVwRs2, it is determined that the front wheel side and the rear wheel side cause the left and right wheel rotation speed difference more than the threshold. The vehicle is in the steering holding state where the vehicle is performing the regular circular turning. On this occasion, it is determined that each of the wheel rotation speeds VwFL to VwRR is in the normal state, and the processing proceeds to step S12.

Hence, the maximum value Limwmax which does not limit a control output as the wheel rotation speed limiting value limw, and the wheel rotation speed limiting value Limw is output to the limiting value selecting part 40e. Accordingly, a gain doubling command Iref24 is not limited by the wheel rotation speed limiting value Limw, and so the gain doubling command Iref24 is output as it is as the second steering assist torque command Iref2.

However, in the state where the absolute value of the left and right wheel rotation speed difference ΔVwF of the front wheels is more than or equal to the threshold ΔVwFs2, and where the absolute value of the left and right wheel rotation speed difference ΔVwR of the rear wheels is smaller than the threshold VwRs2, it indicates the wheel holding state where there is a difference between inside and outside wheels at the front wheels that are the driven wheels, whereas it indicates the straight driving state at the rear wheels that are the driving wheels. Therefore, for example, a wheel that is an inside wheel of the rear wheels travels on a road having a super low friction coefficient and a wheel that is the outside wheel travels on a road having a high friction coefficient. Accordingly, it is determined that a the inside wheel of the driving wheel slips on the road having a low friction coefficient, and the wheel rotation speeds VwRL to VwRR of the corresponding wheels are changed.

Hence, the processing proceeds from step S15 to step S16, where the wheel rotation speed limiting value Limw is calculated by referring to the wheel rotation speed limiting value calculating map shown in FIG. 17, based on an absolute value of a deviation ΔVwr between the absolute value of the left and right wheel rotation speed difference ΔVwR of the rear wheels and the threshold ΔVwR2. At that time, when the absolute value of the left and right wheel rotation speed difference ΔVwR of the rear wheels is a value close to the threshold ΔVwRs2 and is smaller than a preset value ΔVwl, the wheel rotation speed limiting value Limw is set to the maximum value limwmax that does not limit the gain doubling command Iref24.

Nevertheless, when the absolute value of the deviation ΔVw between the absolute value of the left and right wheel rotation speed difference ΔVwR of the rear wheels and the absolute value of the threshold ΔVwRs2 exceeds a preset value ΔVwl, a wheel rotation speed limiting value Limw smaller than the maximum value limwmax is calculated depending on the absolute value of the deviation ΔVw at that time. The wheel rotation speed limiting value Limaw is supplied to the limiting value selecting part 40e.

In the limiting value selecting part 40e, when the wheel rotation speed limiting value Limw is smaller than the vehicle speed limiting value limy, the wheel rotation speed limiting value Limw is selected as a limiting value Lim and is supplied to the limiter 41.

Consequently, the second steering assist torque limiting value Iref2 obtained by limiting the gain doubling command value Iref24 by the wheel rotation speed limiting value limw is output from the limiter 41. Thereby, an influence of a change in the wheel rotating speed due to the disturbance is alleviated, thus securely preventing self-steering and a control error output.

Further, in the state where it is determined that the left and right wheel rotation speed difference ΔVwF of the front wheels that are driven wheels is smaller than the threshold ΔVwFs2, and is in the straight driving state, when the absolute value of the left and right rotation speed difference ΔVwR of the rear wheels that are driving wheels is smaller than or equal to the threshold ΔVwRs3, it is determined that the wheel rotation speeds VwFL to VwRR are normal.

On the other hand, in the state where it is determined that the left and right rotation speed difference ΔVwF of the front wheels that are driven wheels is less than the threshold ΔVwFs2, and the vehicle is in the straight driving state, when the absolute value of the left and right wheel rotation speed difference ΔVwR of the rear wheels that are the driving wheels is more than the threshold ΔVwRs3, a wheel at the inside turning wheel of the rear wheel (or the outside wheel) runs on the road having the low friction coefficient, and a wheel at the outside wheel (or the inside wheel) runs on the road having high friction coefficient. It is determined that a wheel slip is occurring in the wheel having the low friction coefficient and is determined that corresponding wheel rotation speed is increased, and the processing proceeds to step S16.

Thus, the wheel rotation speed limiting value limw is calculated, referring to the wheel rotation speed limiting value calculating map shown in FIG. 17, based on the absolute value of the deviation ΔVw between the absolute value of the left and right wheel rotation speed difference ΔVwR of the rear wheels and the threshold ΔVwRs3, and the calculated wheel rotation speed limiting value limw is output to the limiting value selecting part 40e.

Accordingly, when the wheel rotation speed limiting value limw is the smallest value, the wheel rotation speed limiting value Limw is selected, and is output to the limiter 41 as an output limiting value Lim. Thereby, a value in which the gain doubling command Iref24 limited by the wheel rotation speed limiting value limw is output from the limiter 41 as a second steering assist torque command Iref2, and is output to the motor driving circuit 24 via the command selecting part 34. On the account, even if an error occurs in the wheel rotation speed, the electric motor 12 is rotationally driven with the second steering assist torque command Iref2 which is limited by the wheel rotation speed limiting value Limw, and is allowed to continue a steering assist control while securely preventing the self-steering and the control error output.

Incidentally, while in the first embodiment, an explanation is made by giving an example where the controller 15 is configured by hardware, not limited thereto, a microcomputer may be applied as the controller 15, to process by software all the functions covering the rotation information calculating part 20, the steering assist torque command calculating part 21, and the command compensating part 22. A processing supposable, in this case, would have only to execute by microcomputer the steering assist control processing shown in FIG. 21.

Figure 21:
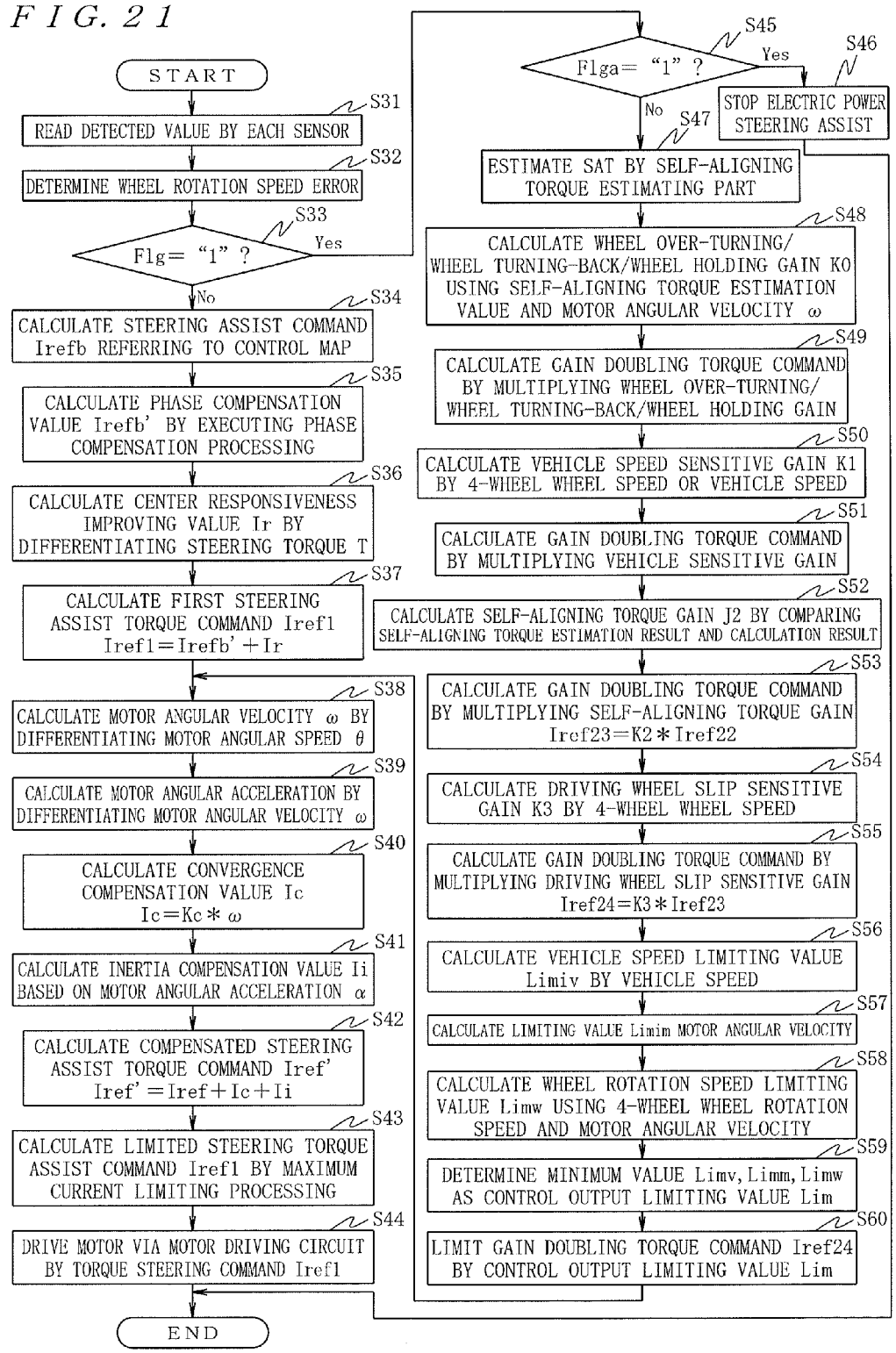
FIG. 21 is a flowchart showing an example of a steering assist initial control procedure executed by a microcomputer.

Here, as shown in FIG. 21, the steering assist control processing is executed as timer interrupt process invoked for every predetermined time (e.g., 1 msec). First, at step S31, detected values detected by various sensors such as the steering torque sensor 14, the vehicle speed sensor 16, the motor rotation angle sensor 17, and the wheel rotation speed sensor 18 are read.

Then, the processing proceeds to step S32 where the steering rotation speed sensor defect detecting processing shown in FIG. 16 is executed. Subsequently, the processing proceeds to step S33 where the tore sensor error detecting flag Flg is read which is set by the torque sensor error detecting processing shown in FIG. 20, and it is determined on whether or not the torque sensor error detecting flag Flg is set to "0".

If the torque sensor error detecting flag Flg is reset to "0", the processing proceeds to step S34, or also if the torque sensor error detecting flag Flg is set to "1", the processing proceeds to step S45.

At step 34, a steering assist torque command irefb is calculated, referring to the aforementioned steering assist torque command calculating map, based on the steering torque T, and then the processing proceeds to step S35.

At step S35, a phase compensation processing is applied to the calculated steering assist torque command Irefb to calculate a phase compensated steering assist torque command Irefb'. Then, the processing proceeds to step S36 where the steering torque T is differentiated to calculated a center responsiveness improving value Ir. In turn, the processing proceeds to step S37.

At step S37, the center responsiveness improving value Ir is added to the phase compensated steering assist torque command Irefb' to calculate a first steering assist torque command Iref1 (=Irefb'+Ir). The first steering assist torque command Iref1 is stored for update in a torque command storage memory of a memory such as a RAM, as a steering assist torque command Iref1, and then the processing proceeds to step S38.

At step S38, the motor angle θ is differentiated to calculate the motor angular velocity ω, Then, the processing proceeds to step S39 where the motor angular velocity ω is differentiated to calculate a motor angular acceleration α.

In turn, the recessing proceeds to step S40 where a compensation coefficient Kc which is set depending on the vehicle speed Vs is multiplied by the motor angular velocity ω in the same way as the convergence compensating part 43 to calculate a convergence compensation value Ic, and then the processing proceeds to step S41.

At step S41, as with the inertia compensating part 44, an inertia compensation value Ii is calculated based on the motor angular acceleration α. Then, the processing proceeds to step S42 where the convergence compensation value Ic and the inertia compensation value Ii calculated at steps S40, S41 are added to the steering assist torque command Iref stored in the torque command storage area of the memory such as RAM to calculate a compensated steering assist torque command Iref', and then the processing proceeds to step S43.

At the step S43, a maximum limiting processing is applied to the calculated limited steering assist torque command Iref' to calculate a compensated limited steering assist torque command iref''. Then, the processing proceeds to step S44 where the calculated limited steering assist torque command Iref'' is output to the motor driving circuit 24 to drive the electric motor 12.

In the meanwhile, when the determined result at step S23 shows that the sensor error detecting flag Flg is set to "1", it is determined that the steering torque sensor 14 is error, and the processing proceeds to step S45. At step S45, a wheel rotation speed error flag Flga is read which is set by the wheel rotation speed error detecting processing shown in FIG. 15. If the wheel rotation speed error flag Flga is set to "1", it is determined that the four-wheel rotation speed sensor 18 is abnormal, and the processing proceeds to step S46, where the steering assist control is stopped, and then the steering assist control processing is terminated.

When the determined result at step S45 shows that the wheel rotation speed error sensor flag Flga is reset to "0", it is determined that the four-wheel rotation speed sensor 18 is normal, and the processing proceeds to step S47. The wheel rotation speeds ΔVwF in the equation (1) is calculated based on the wheel rotation speeds VwFL, VwFR of the front wheels that are driven wheels. The sideslip angle β of the vehicle is calculated, by referring to the sideslip angle calculating map shown in FIG. 5, based on the calculated wheel sideslip angle β. The self-aligning torque initial estimation value SATi is subjected to the low pass filtering and the phase compensation processing to calculate the self-aligning torque estimation value SAT.

Next, the processing proceeds to step S48 where a determination is made on whether or not in which steering state the vehicle is among the wheel over-steering state, the wheel turning-back state, or the wheel holding state, based on the calculated self-aligning torque estimation value SAT and the motor angular velocity ω. Depending on the determined steering state, a steering gain KO is calculated referring to the steering state sensitive gain calculating map.

The processing then proceeds to step S49 where the calculated steering state gain KO is multiplied by the self-aligning torque estimation value SAT calculated at step S39 to calculate a gain doubling command Iref21 (=SAT*K0).

The processing proceeds to step S50 where a vehicle speed sensitive gain K1 is calculated, by referring to the vehicle speed sensitivity gain calculating map shown in FIG. 9, based on the average value of the four-wheel rotation speeds VwFL to vwRR and the vehicle speed Vs. The processing then proceeds to step S51 where the calculated vehicle speed sensitive gain K1 is multiplied by the gain doubling commend Iref21 to calculate a gain doubling command Iref22 (=Iref21*K1).

Then, the processing proceeds to step S52 where the aforementioned equations (2) and (3) are computed, utilizing a vehicle model, based on the four-wheel rotation speeds VwFL to VwRR and the motor angle θ to calculate a self-aligning torque calculating value SATo. A deviation ΔSAT is calculated between the calculated self-aligning torque calculating value SATo and the self-aligning estimation value SAT calculated at step S47. The self-aligning torque gain K2 is calculated, by referring to the self-aligning torque calculating map shown in FIG. 11 based on the calculated absolute value |ΔSAT| of the calculated deviation ΔSAT.

The processing then proceeds to step S53 where the calculated self-aligning torque gain K2 is multiplied by the gain doubling command Iref22 to calculate a gain doubling command Iref23 (=Iref22*K2).

The processing next proceeds to step S54 where a driving wheel slip ratio ΔVw based on the four-wheel rotation speeds VwFL to VwRR, and a driving wheel slip ratio K3 is calculated, by referring to the driving wheel map calculating map shown in FIG. 13, based on the absolute value |ΔVw| thereof.

The processing proceeds to step S55 where the calculated driving wheel slip gain K3 is multiplied by the gain doubling command Iref23 to calculate a gain doubling command Iref24 (=Iref23*K3).

Then, the processing proceeds to step S56 where the vehicle speed limiting value Limv is calculated, by referring to vehicle speed limiting value calculating map shown in FIG. 18, based on the vehicle speed Vs. The processing in turn proceeds to step S57 where a motor angular velocity limiting value Limm is calculated, by referring to the motor angular velocity limiting value calculating map shown in FIG. 19, based on the motor angular velocity ω.

The processing proceeds to step S58 where the wheel rotation speed limiting value calculating processing shown in FIG. 16 is performed based on the four-wheel rotation speeds VwFL to VwRR and the motor angular velocity 9 to calculate the wheel rotation speed limiting value Limw.

The processing proceeds to step S59 where a minimum value of the vehicle speed limiting value limv, the motor angular velocity limiting value limm, and the wheel rotation speed limiting value Limw is determined as an output control limiting value Lim. Then, the processing proceeds to step S60. At step S60, the gain doubling command Iref24 is limited with the determined output limiting value Lim to calculate the second steering assist torque command value Iref2. The calculated second steering assist torque command value Iref2 is stored for update to a preset command storage area with it as the steering assist torque command Iref, and then the processing proceeds to step S38.

In the processing in FIG. 21, the processing at step S34 corresponds to the emergency switching unit, the processing at steps S34 to S37 correspond to the first torque command calculating unit, the processing at steps S47 to S60 correspond to the second torque command calculating unit, among those, the processing at steps S38 to S44 to the motor control unit, the processing at step S48 to step S55 correspond to the gain adjusting unit, and the processing at steps S45, S46, and S58 to S60 correspond to the emergency command limiting unit, respectively.

In this way, by executing the steering assist control processing shown in FIG. 21, the processing at steps S34 to S37 in the steering assist control processing shown in FIG. 21 are performed using the microcomputer as with the aforesaid first embodiment, when the steering torque sensor 14 is normal, to thereby calculate the first steering assist torque command Iref1. Further, when the steering torque sensor 14 is abnormal and the four-wheel rotation speed sensor 18 is normal, the processing at steps S47 to S59 are executed to calculate the second steering assist torque command Iref2. Accordingly, based on the wheel rotation speeds VwFL to VwRR, the self-aligning torque SAT that is a reaction force from the road surface which is to be input to the rack shaft of the steering gear, based on the wheel rotation speeds VwFL to VwRR. Gain adjustment and gain limitation are applied to the estimated self-aligning torque SAT, to calculate the second steering assist torque command Iref2.

On that account, when the steering torque sensor 14 is normal, the electric motor 12 is drive controlled based on the first steering assist torque command Iref1 for a correct steering assist control. Otherwise, when an error is occurring in the steering torque sensor 14, when the wheel rotation speed sensor 18 is normal, the self-aligning torque SAT is estimated based on the wheel rotation speeds VwFL to VwFR. Again adjustment and a torque control are applied to the estimated self-aligning torque SAT to calculate the second steering torque command Iref2.

Thus, even when the steering torque sensor 14 is transferred from the normal state to the error state, it allows calculation of the optimum steering assist control based on the second steering assist torque command Iref2.

Further, where the steering torque sensor 14 falls into the error state, when the wheel rotation speed sensor 18 is abnormal, the steering assist control is stopped.

Furthermore, when the anti-lock braking system is activated, it affects on the four-wheel rotation speeds VwFL to VwRR as well.

In this situation, in the wheel rotation speed error detecting processing, when the wheel rotation speed error detecting processing shows that the state indicating whether the absolute value of the left and right wheel rotation speed VVwF of the front wheels is smaller than the threshold ΔVwFs2, and a state indicating whether or not the absolute value of the left and right wheel rotation speed difference ΔVwR of the rear wheels smaller than the threshold ΔVwRs2 are matched to each other, it is determined that respective wheel rotation speeds VwFL to VwRR are normal. If the both states do not match, the wheel rotation speed is changed by activation of the anti-lock braking system and that the change in the wheel rotation speed is caused due to the disturbance.

When a change in the wheel rotation speed occurs, reading a braking command of the anti-lock braking system may identify which wheel is in the braking state. Hence, a wheel rotation speed limiting value Limw may be calculated, by referring to the wheel rotation speed limiting value calculating map shown in FIG. 17, based on the absolute value of the wheel rotation speed difference of the front wheel or the rear wheel including the wheel and the absolute value of the deviation from the threshold.

While In the first embodiment, an explanation is made as to the case where a rear wheel driving vehicle is a target, not limited thereto, the present invention may be applied to a front wheel driving car or to a four-diving car. Herein, when the present invention is applied to the front wheel vehicle, it has only to take a front wheel as a driving wheel and a rear wheel as a coupled driving wheel.

Instead, when the present invention is to be applied to the four-wheel driving car, in the processing shown in FIG. 16, when the state indicating whether the absolute value of the left and right wheel rotation speed difference ΔVwF of the front wheels is smaller than the threshold ΔVwF, and the state indicating whether the absolute value of the left and right wheel rotation speed difference ΔVwR is smaller than the threshold ΔVwRs2 are matched to each other, it is determined that the wheel rotation speeds VwFL to VwRR are normal. Otherwise, when the both is not matched to each other, it is determined that the wheel rotation speed VwFL or VwFR of the front wheels, or the wheel rotation speed VwRL or VwRR of the rear wheels are error due to the disturbance.

While In the first embodiment, an explanation is made as to the case where when the vehicle speed limiting value Limw is calculated by the vehicle speed value limiting part 40c, the vehicle speed Vs detected by the vehicle speed sensor 16 is used, not limited thereto, a vehicle speed may be applied, which is calculated based on the wheel rotation speeds VwFL to VwRR detected by the wheel rotation speed sensor 18.

An explanation will next be made to a second embodiment of the present invention deferring to FIG. 22 to FIG. 24.

In the second embodiment, a motor angle θ detected by the motor angle signal sensor 200 is also supplied to the wheel rotation speed limiting value calculating part 40b in the control output limiting value calculating part 40 of the torque limiting part 32C, and the wheel rotation speed limiting value is calculated using the motor angle θ.

Figure 22:
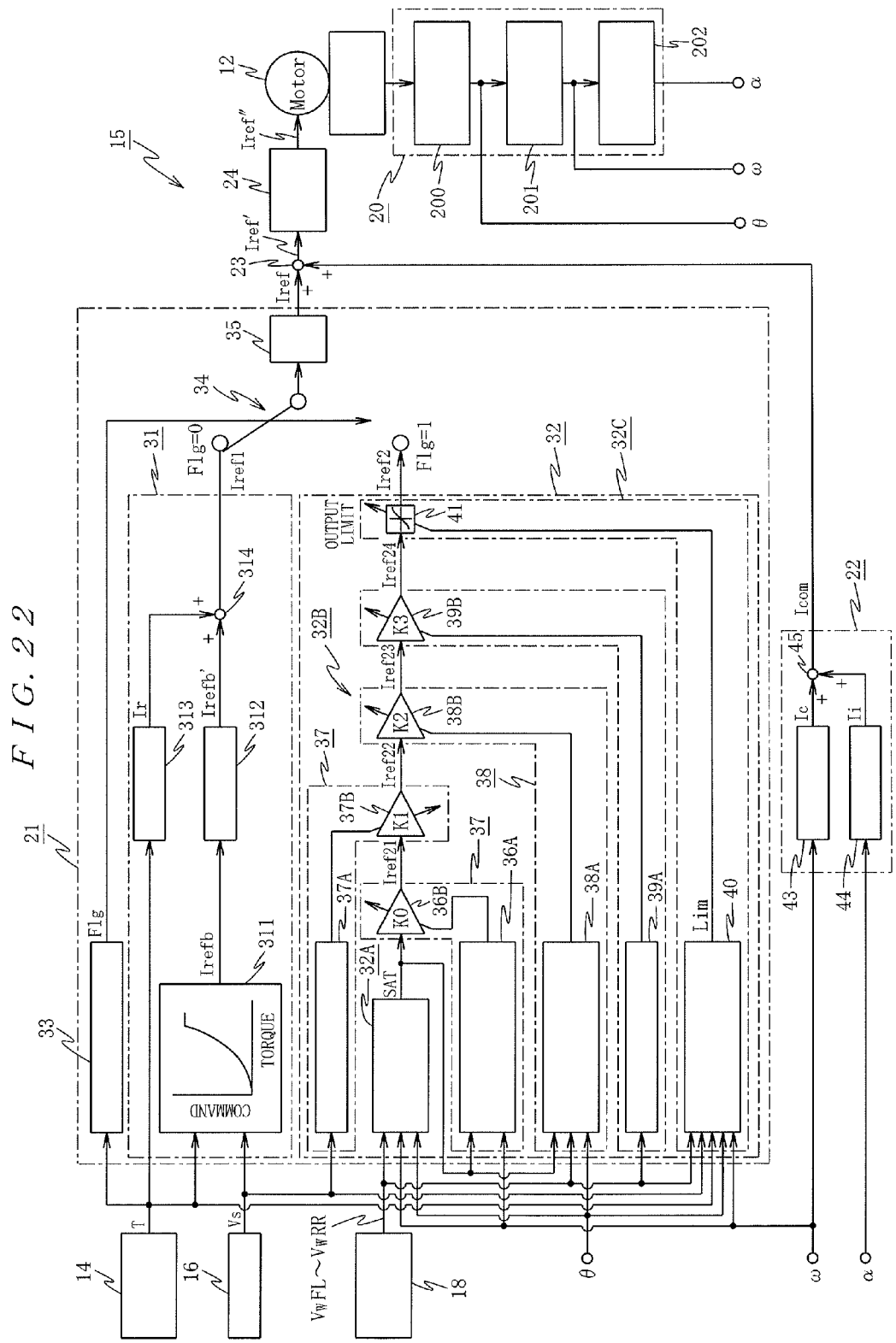
FIG. 22 is a block diagram showing a specific example of the controller indicating a second embodiment of the present invention.
Figure 23:
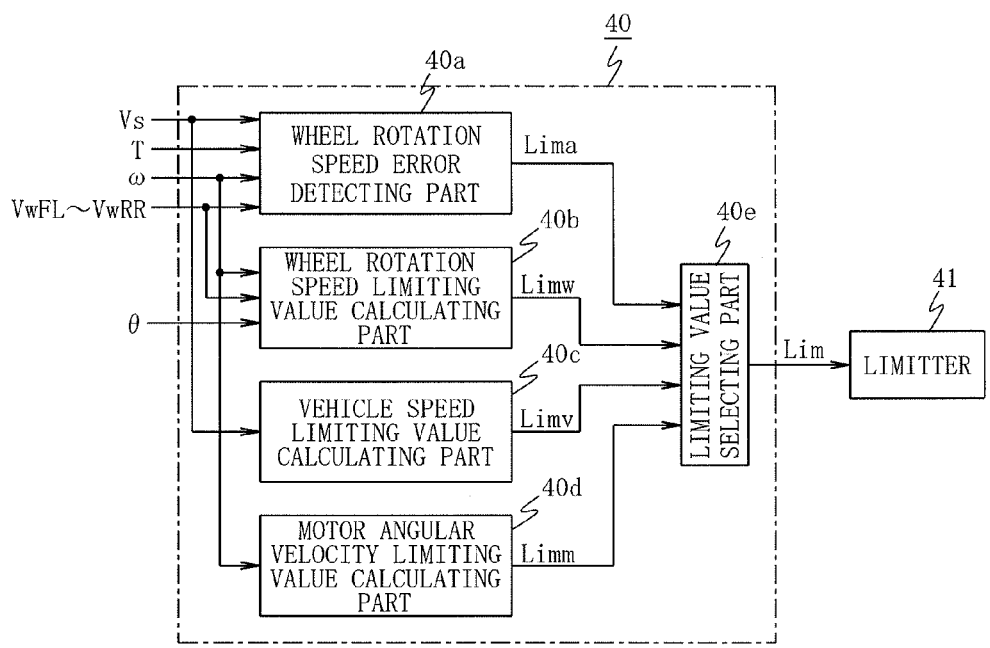
FIG. 23 is a block diagram showing a specific configuration of the control output limiting value calculating part shown in FIG. 22.

That is, in the second embodiment, as shown in FIG. 22, the motor angle θ is input to the control output limiting value calculating part 40, and as show in FIG. 23, the motor angle θ is input to the wheel rotation speed limiting value calculating part 40b.

Figure 24:
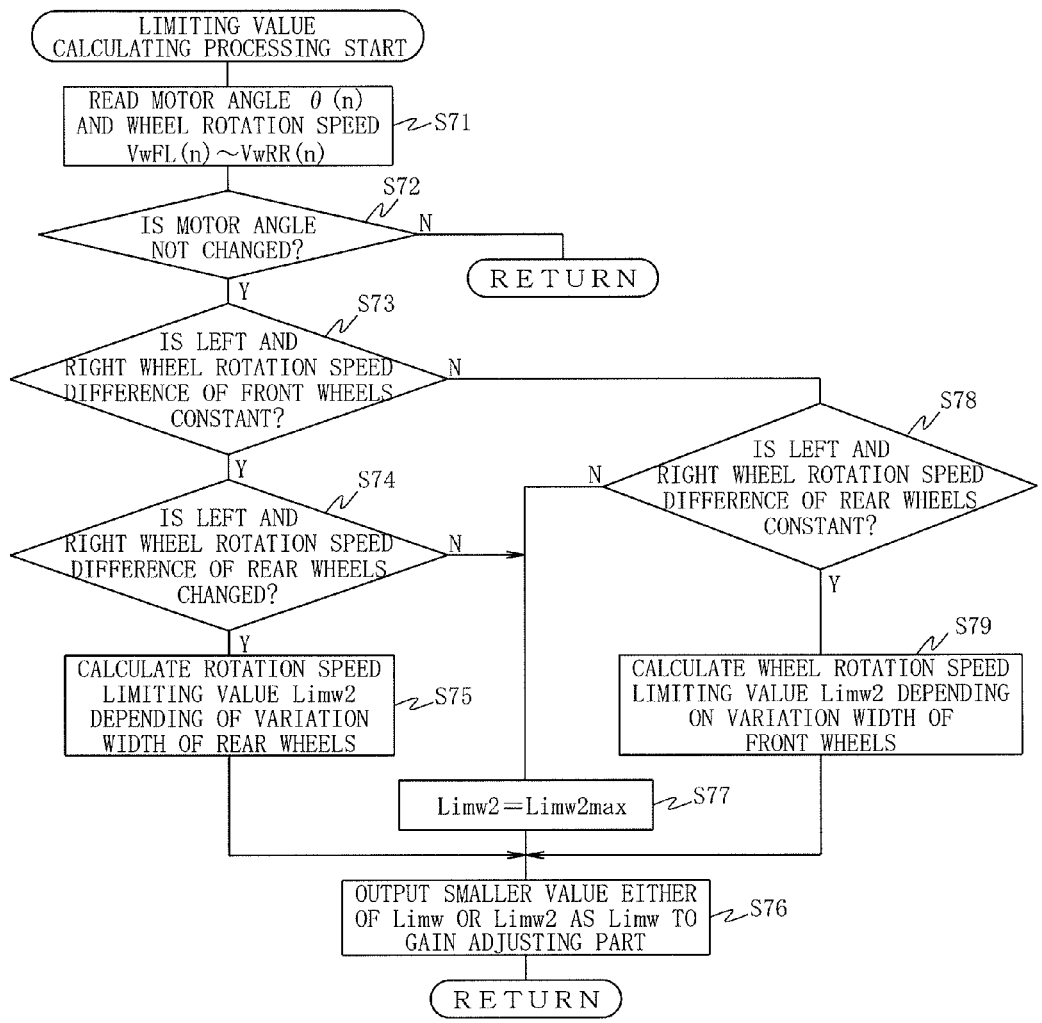
FIG. 24 is a flowchart showing an example of a wheel rotation speed limiting value calculating procedure executed by the wheel rotation speed limiting value calculating part shown in FIG. 23.

In the wheel rotation speed limiting value calculating part 40b, as with the aforementioned first embodiment, the wheel rotation speed limiting value calculating processing shown in FIG. 16 is executed based on the motor angular velocity ω, and the wheel rotation speed limiting value calculating processing shown in FIG. 24 is executed.

The wheel rotation limiting value calculating processing shown FIG. 24 is executed as timer interrupt process invoked for every preset time (e.g. 1 msec). First, at step S71, the motor angle θ (n) and the four-wheel rotation angles VwFL to VwRR are read and they are written in a first stage of a shift register with a predefined wheel rotation m stages individually reserved in a memory such as RAM. Then, the processing proceeds to step S72.

At step S72, the motor angels θ(n) to θ(n−m−1) stored in the shift register are read and is determined whether the motor angle is changed. The judgment is made by determining whether a variable θw obtained by subtracting the maximum value from the minimum value of the motor angles θ(n) to θ(n−m−1) is less than or equal to the threshold θws which is determinable that the predefined set motor angle is hardly changed.

When the determined result at step S72 shows that an angular variation of the motor occurs, the timer interrupt process is terminated as it is, and the processing returns to the main program. Otherwise, when the angular variation of the motor does not occur, the processing proceeds to step S73.

At step S73, a determination is made on whether or not the left and right rotation angle difference ΔVwF(n) to ΔVwF(n−m−1) of the front wheels is a substantially constant value. Even in this case, it is determined whether or not a variation width Wf obtained by subtracting the minimum value from the maximum value of the left and right rotation angle difference ΔVwF(n) to ΔVwF(n−m−1) is smaller than or equal to a threshold Wfs in which the variation width Wf can be regarded the left and right wheel rotation speed ΔVwF as constant.

When the determined result at step S73 shows that the left and right wheel rotation speed difference ΔVwF of the front wheels is constant, the processing proceeds to step S74 to determine whether or not the left and right wheel rotation speed difference VwR(n) to ΔVwR(n−m−1) is varied. If a variation is occurring in the left and right wheel rotation speed difference ΔVwR (n) to ΔVwR (n−m−1), it is determined that an error exists in the wheel rotation speeds VwRL or VwRR of the rear wheels, and the processing proceeds to step S75.

Figure 25:
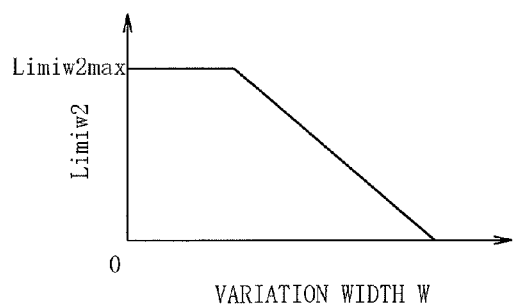
FIG. 25 is a characteristic diagram showing the wheel rotation speed limiting value calculating map used in FIG. 24.

At step S75, the wheel rotation speed limiting value Limw2 is calculated, by referring to the wheel rotation speed limiting value calculating map shown in FIG. 25. Based on fluctuation range W obtained by subtracting the minimum value from the maximum value of the left and right rotation speed differences ΔVwR(n) to ΔVwR(n−m−1). Then, the processing proceeds to step S76 to determine that either of the calculated wheel rotation speed limiting value Limw2 or the wheel rotation speed limiting value limw calculated in FIG. 16 that is smaller is adopted as a wheel rotation speed limiting value Limw. The wheel rotation speed limiting value Limw is output to the limiting value selecting part 40e, then the time interrupt process is terminated, and returns to the main program.

When the determined result at step S74 shows that the left and right wheel rotation speed difference ΔVwR is not changed, it is determined that each left and right wheel rotation speed VwFL to VwRR is normal, and the processing proceeds to step S77. A maximum value Limw2max which does not limit an control output i.e. the gain doubling command Iref24 as a wheel rotation speed limiting value Limw2 is set, and then the processing proceeds to step S76.

Moreover, when the determined result at step S73 shows that the left and right wheel rotation speed difference ΔVwR of the front wheels is not substantially constant and is varying, the processing proceeds to step S78. It is determined whether or not the left and right wheel rotation speed difference ΔVwR(n) to ΔVwR(n−m−1) is substantially constant. If the left and right wheel rotation speed difference ΔVwR of the rear wheels is varied, then it is determined that each of the wheel rotation speed VwFL to VwRR is normal, and the processing proceeds to step S77. Otherwise, if the left and right wheel rotation speed difference ΔVwR is substantially constant, it is determined that the rotation speeds VwFL to VwRR of the front wheels are erroneous, and the processing proceeds to step S79.

At step S79, the wheel rotation speed limiting value Limw2 is calculated, by referring to the wheel rotation speed limiting value calculating map shown in FIG. 25, based on the fluctuation range W obtained by subtracting the minimum value from the maximum value of the left and right wheel rotation speed difference ΔVwF(n) to ΔVwF(n−m−1), and then the processing proceeds to step S76.

In this manner, according to the second embodiment, since an error in the wheel rotation speeds VwFL to VwRR are detected based on the motor angle θ, in addition to the operation and effect exerted by the aforementioned first embodiment, it enables detection of the error in the wheel rotation torque speeds VwFL to VwRR with accuracy.

incidentally, while in the second embodiment, an explanation is made as to the case where the motor angle detected by the motor angle signal sensor 200 is used as the motor angle θ, not limited thereto, a motor angle sensor may be provided to calculate the motor angle θ by differentiating the motor angular velocity ω detected by the motor angle sensor, is detected a motor reverse electromotive voltage of the electric motor 12 to calculate a motor angular velocity based on the detected motor reverse electromotive voltage, and to calculate the motor angle θ by differentiating the calculated angular velocity.

Further, since in the second embodiment, the motor angle θ is input to the control output limiting value calculating part 40, a motor angle variation Δθ per unit time of the motor angle θ may be calculated to use in the calculating operations shown in FIG. 15 and FIG. 16 in place of the motor angular velocity ω.

Figure 26:
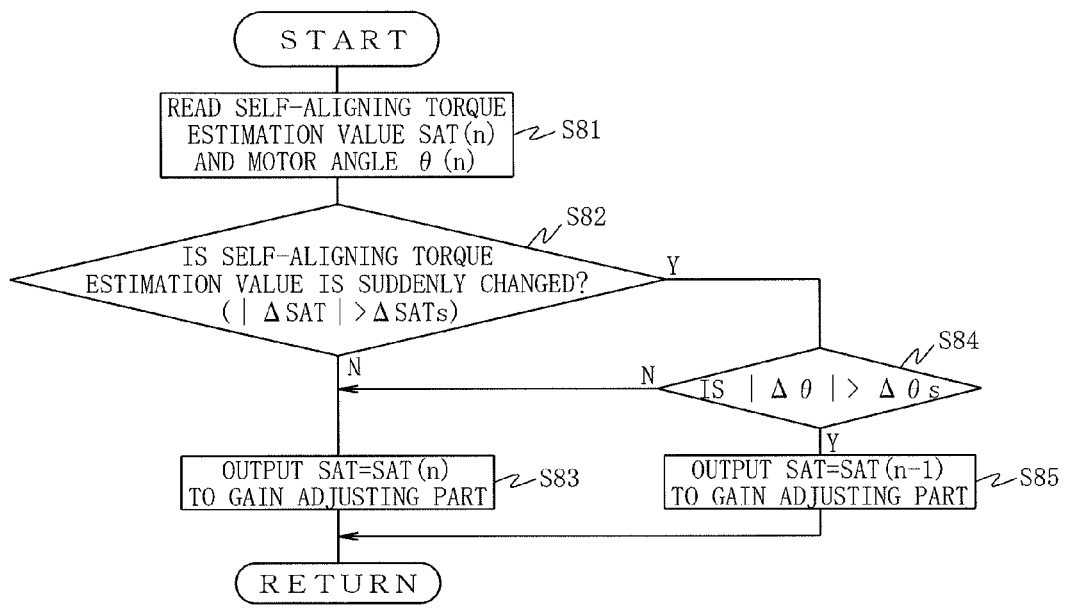
FIG. 26 is a flowchart showing an example of a self-aligning torque selecting procedure executed by the self-aligning torque estimation part indicating the second embodiment of the present invention.

An explanation will then be made to a third embodiment of the present invention referring to FIG. 26.

In the third embodiment, the embodiment aims at improving estimation accuracy of the self-aligning torque estimation value SAT based on the four-wheel rotation speed and the motor angle.

Namely, in the third embodiment, although the third embodiment has the same system configuration as the second embodiment, a self-aligning torque estimation selecting processing will be executed, by the self-aligning torque estimating part 32A shown in FIG. 26.

The self-aligning torque estimation value selecting processing is executed as a timer interrupt process invoked for every preset time (e.g. 10 msec). First, at step S81, the self-aligning estimation value SAT (n) output from the phase correction part 331 and the motor angle (θ) detected by the motor angle signal sensor 200. Then, the processing proceeds to step S82.

At step S82, the determination is made on whether or not the self-aligning estimation value SAT is abruptly changed. The judgment is made by subtracting the self-aligning torque estimation value SAT(n−1) read at the previous processing from the self-aligning torque estimation value SAT(n) read this time to find a self-aligning variation ΔSAT to thereby determine whether or not the absolute value of the found self-aligning torque variation ΔSAT is more than a threshold ΔSATs which is used for determining a sudden change of the preset self-aligning estimation value SAT.

When the determining result at step S82 shows that there is a relation of |ΔSAT|≤ΔSATs, judging that the self-aligning torque estimation value SAT is suddenly changed, and the processing proceeds to step S83. At step S83, the self-aligning torque estimation value SAT (n) output from the phase correction part 331 is output as it is as the self-aligning torque estimation value SAT to the gain adjusting part 32B.

On the other hand, when the determined result at step S82 shows that there is a relationship of |ΔSAT|>ΔSATs, judging that the self-aligning torque estimation value SAT (n) is suddenly changed, and the processing proceeds to step S84. At step S81, the motor angle variation Δθ is calculated by subtracting the motor angle θ(n−1) read at the previous processing from the motor angle θ(n) read, and it is determined whether or not the calculated motor angle variation Δθ exceeds the preset threshold Δθs.

If the determined result at step S84 shows that there is a relationship satisfying |Δθ|≥θs, it is determined that the motor angle variation Δθ is small, the self-aligning torque estimation value SAT is not suddenly changed due to an error of the wheel rotation speeds VwFL to VwRR, and the processing proceeds to step S83. If there is a relationship satisfying |Δθ|>Δθs, it is determined that the self-aligning torque estimation value SAT is suddenly changed, the motor angular velocity Δθ is large, and an error is occurring in any of the wheel rotation speeds VwFL to VwRR, and the processing proceeds to step S85.

At step S85, the self-aligning torque estimation value SAT (n−1) at the time of previous processing is output as the self-aligning torque estimation value SAT to the gain adjusting part 32B instead of the self-aligning torque estimation value SAT (n) output from the phase correction part 331.

According to the third embodiment, when the self-aligning torque estimation value SAT output from the phase correction part 331 of the self-aligning torque estimating part 32A is suddenly changed, if the absolute value of the motor angle variation Δθ during this period is smaller than the threshold Δθs, it is determined that an error is not occurring in the wheel rotation speeds VwFL to VwRR and the self-aligning torque estimation value SAT output from the phase correction part 331 is output as it is to the gain adjusting part 32B. Calculation of the second steering assist torque command Iref2 by the self-aligning torque estimation value STA is continued.

However, when the self-aligning torque estimation value SAT output from the phase correction part 331 of the self-aligning torque estimating part 32A is suddenly changed, if the absolute value of the motor angle variation Δθ during this period is larger than the threshold Δθs, it is determined that an error is occurring in the wheel rotation speeds VwFL to VwRR, and the self-aligning torque estimation value SAT (n−1) read at the previous processing is output to the gain adjusting part 32B instead of the self-aligning torque estimation value SAT (n). Accordingly, the rotation speed of the electric motor 12 can be calculated so as not to be affected due to the occurrence of an error in any of the wheel rotation speeds VwFL to VwFR.

For that account, the present invention securely prevents the occurrence of a control error due to an error estimation of the self-aligning torque estimation value SAT by the self-aligning torque estimating part 32A, thereby improving self-aligning estimation accuracy.

Alternatively, even in the third embodiment, the motor angle θ is not necessarily limited to the case where the motor angle θ detected by the motor angle sensor such as a resolver may be used, an integrated value obtained from the motor angular velocity or the reverse electromotive voltage may be used.

INDUSTRIAL AVAILABILITY

There is provided an electric power steering device. When an error occurring at a steering torque detecting unit is detected, an accurate torque detection value is obtained in consideration of the road surface situations based upon the wheel rotation speeds. Even after the steering torque detecting unit has an error, a steering assist control can be continued without giving an uncomfortable feeling to a driver. When an error occurs at the wheel rotation speed, it is possible to prevent an occurrence of self-steer or control error output.

REFERENCE SIGNS LIST

SM: steering mechanism
1: steering wheel
2: steering shaft
2a: input shaft
2b: output shaft
3: steering column
4, 6: universal joint
5: intermediate shaft
8: steering gear mechanism
9: tie rod
WL, WR: steering wheel
10: steering assist mechanism
11: decelerating mechanism
12: electric motor
14: steering torque sensor
15: controller
16: vehicle speed sensor
17: rotation angle sensor
18, 18L, 18R: wheel rotation speed sensor
20: rotation information calculating part
201: motor angular velocity calculating part
212: motor angular acceleration calculating part
21: steering assist torque command calculating part
22: command calculating part
23: current limiting part
24: motor driving circuit
31: first steering assist torque command calculating part
311: torque command calculating part
312: phase compensating part
313: center responsiveness improving part
314: adder
32: second steering assist torque command calculating part
32A: self-aligning torque estimating part
32B: gain adjusting part
32C: torque limiting part
321: vehicle sideslip angle estimating part
322: angle variation calculating part
323: amplifier
324: adder
325: self-adjusting torque calculating part
326: amplifier
327: adder
328: low pass filter
329: adder
330: average value calculating part
331: phase correction part
33: torque sensor error detecting part
34: command selecting part
36: steering state gain adjusting part
37: vehicle speed sensitive gain adjusting part
38: self-aligning torque again adjusting part
38A: self-aligning torque gain setting part
38B: gain multiplying part
39: driving wheel slip gain adjusting part
40: control output limiting value calculating part
40a: wheel rotation steep error detecting part
40b: wheel rotation speed control value calculating part
40c: vehicle speed limiting value calculating part
40d: motor angular velocity limiting value calculating part
40e: limiting value selecting part
41: limiter
43: convergence compensating part
44: inertia compensating part
45, 46: adder

The invention claimed is:
1. An electric power steering apparatus comprising:
a steering torque detecting unit configured to detect a steering torque input to a steering mechanism;
a first torque command calculating unit configured to calculate a first torque command based on the steering torque detected by the steering torque detecting unit;
an electric motor configured to generate a steering assist torque to be supplied to the steering mechanism;

a torque detecting unit error detecting unit configured to detect error of the steering torque detecting unit;
a wheel rotation speed detecting unit configured to detect a wheel rotation speed of a vehicle;
a motor rotation information detecting unit configured to detect motor rotation information of the electric motor;
a second torque command calculating unit configured to calculate a second torque command based on the wheel rotation speed detected by the wheel rotation speed detecting unit;
an emergency switching unit configured to select the first torque command, when an error of the torque detecting unit is not detected by the torque detecting unit error detecting unit, and configured to select the second torque command, when an error of the torque detecting unit is detected by the torque detecting unit error detecting unit;
a motor control unit configured to drive control the electric motor based on the torque command selected by the emergency switching unit;
a wheel rotation speed error detecting unit configured to detect an error of the wheel rotation speed based on at least one of the wheel rotation speed detected by the wheel rotation speed detecting unit, the steering torque detected when the steering torque detecting unit is normal, and the motor rotation information detected by the motor rotation information detecting unit; and
an emergency command limiting unit configured to limit the second torque command when the second torque command is selected by the emergency switching unit, where the error of the wheel rotation speed is detected by the wheel rotation speed error detecting unit, wherein
where the error of the wheel rotation speed is detected when the second torque command is selected, the emergency command limiting unit limits the second torque command to a limiting value calculated as a function of a deviation between a threshold and a left and right wheel rotation speed difference detected by the wheel rotation speed detecting unit.

2. The electric power steering apparatus according to claim 1, wherein when the second torque command is selected instead of the first torque command, the emergency switching unit gradually changes a command from the first torque command to the second torque command.

3. The electric power steering apparatus according to claim 1, wherein the second torque command calculating unit comprises a self-aligning torque estimating unit configured to estimate a self-aligning torque applied to the steering mechanism based on the wheel rotation speed, and calculates the second torque command based on the self-aligning torque estimated by the self-aligning torque estimating unit.

4. The electric power steering apparatus according to claim 3, wherein when the second torque command is selected instead of the first torque command, the emergency switching unit gradually changes a command from the first torque command to the second torque command.

5. The electric power steering apparatus according to claim 3, wherein the self-aligning torque estimating unit comprises a vehicle sideslip angle estimating unit configured to estimate a wheel sideslip angle based on the wheel rotation speed, and estimates the self-aligning torque based on the vehicle sideslip angle estimated by the vehicle sideslip angle estimating unit.

6. The electric power steering apparatus according to claim 5, wherein the vehicle sideslip angle estimating unit estimates the vehicle sideslip angle based on the wheel rotation speed and to correct the estimated sideslip angle based on the motor rotation information detected by the motor rotation information detecting unit.

7. The electric power steering apparatus according to claim 5, wherein when the error of the wheel rotation speed is detected, the emergency command limiting unit stops an output of the second torque command when the second torque command is selected.

8. The electric power steering apparatus according to claim 5, wherein where the error of the wheel rotation speed is detected, when the second torque command is selected, the emergency command limiting unit sets, as a second torque command, the second torque command before the error is detected.

9. The electric power steering apparatus according to claim 3, wherein the self-aligning torque estimating unit estimates the self-aligning torque based on the wheel rotation speed and the motor rotation information detected by the motor rotation information detecting unit.

10. The electric power steering apparatus according to claim 9, wherein when an error of the wheel rotation speed is detected, the emergency command limiting unit stops an output of the second torque command when the second torque command is selected.

11. The electric power steering apparatus according to claim 9, wherein where the error of the wheel rotation speed is detected, when the second torque command is selected, the emergency command limiting unit sets, as a second torqued command, the second torque command before the error is detected.

12. The electric power steering apparatus according to claim 1, wherein when the error of the wheel rotation speed is detected, the emergency command limiting unit stops an output of the second torque command when the second torque command is selected.

13. The electric power steering apparatus according to of claim 1, wherein where the error of the wheel rotation speed is detected, when the second torque command is selected, the emergency command limiting unit sets, as a second torqued command, the second torque command before the error is detected.

14. An electric power steering apparatus comprising:
a steering torque detecting unit configured to detect a steering torque input to a steering mechanism;
a first torque command calculating unit configured to calculate a first torque command based on the steering torque detected by the steering torque detecting unit;
an electric motor configured to generate a steering assist torque to be supplied to the steering mechanism;
a torque detecting unit error detecting unit configured to detect error of the steering torque detecting unit;
a wheel rotation speed detecting unit configured to detect a wheel rotation speed of a vehicle;
a motor rotation information detecting unit configured to detect motor rotation information of the electric motor;
a second torque command calculating unit configured to calculate a second torque command based on the wheel rotation speed detected by the wheel rotation speed detecting unit;
an emergency switching unit configured to select the first torque command, when an error of the torque detecting unit is not detected by the torque detecting unit error detecting unit, and configured to select the second torque command, when an error of the torque detecting unit is detected by the torque detecting unit error detecting unit;

a motor control unit configured to drive control the electric motor based on the torque command selected by the emergency switching unit;

a wheel rotation speed error detecting unit configured to detect an error of the wheel rotation speed based on at least one of the wheel rotation speed detected by the wheel rotation speed detecting unit, the steering torque detected when the steering torque detecting unit is normal, and the motor rotation information detected by the motor rotation information detecting unit; and an emergency command limiting unit configured to limit the second torque command when the second torque command is selected by the emergency switching unit, where the error of the wheel rotation speed is detected by the wheel rotation speed error detecting unit, wherein the second torque command calculating unit comprises a self-aligning torque estimating unit configured to estimate a self-aligning torque applied to the steering mechanism based on the wheel rotation speed, and a gain adjusting unit configured to calculate the second torque command by multiplying gain with the self-aligning torque estimated by the self-aligning torque estimating unit, and where the error of the wheel rotation speed is detected when the second torque command is selected, the emergency command limiting unit limits the second torque command to a limiting value calculated as a function of a deviation between a threshold and a left and right wheel rotation speed difference detected by the wheel rotation speed detecting unit.

15. The electric power steering apparatus according to claim 14, wherein the gain adjusting unit determines in which steering states a vehicle is in from a wheel over-turning state, a wheel turning-back state, and a wheel holding state based on either of a vehicle speed calculated based on the motor rotation information detected by the motor rotation information detecting unit or the self-aligning torque estimated by the self-aligning torque estimating unit, and wherein the gain adjusting unit comprises at least one of a steering state gain adjusting unit configured to adjust steering state sensitive gain based on the determined result of the steering, a vehicle speed gain adjusting unit configured to adjust a vehicle speed sensitive gain based on either of the vehicle speed calculated based on the wheel rotation speed detected by the wheel rotation speed detecting unit or the vehicle speed detected by the vehicle speed detecting unit, a self-aligning torque gain adjusting unit configured to adjust the self-aligning torque gain on the basis of a deviation between the motor rotation information detected by the motor rotation information detecting unit and the vehicle rotation speed detected by the wheel rotation speed detecting unit, and the self-aligning torque estimating value estimated by the self-aligning torque estimating unit, and a driving wheel slip gain adjusting unit configured to estimate a driving wheel slip state based on the wheel rotation speed detected by the wheel rotation speed detecting unit, and configured to adjust driving wheel slip sensitive gain based on the estimated driving wheel slip state.

16. The electric power steering apparatus according to claim 15, wherein when the second torque command is selected instead of the first torque command, the emergency switching unit gradually changes a command from the first torque command to the second torque command.

17. An electric power steering apparatus comprising:
a steering torque detecting unit configured to detect a steering torque input to a steering mechanism;

a first torque command calculating unit configured to calculate a first torque command based on the steering torque detected by the steering torque detecting unit;

an electric motor configured to generate a steering assist torque to be supplied to the steering mechanism;

a torque detecting unit error detecting unit configured to detect error of the steering torque detecting unit;

a wheel rotation speed detecting unit configured to detect a wheel rotation speed of a vehicle;

a motor rotation information detecting unit configured to detect motor rotation information of the electric motor;

a second torque command calculating unit configured to calculate a second torque command based on the wheel rotation speed detected by the wheel rotation speed detecting unit;

an emergency switching unit configured to select the first torque command, when an error of the torque detecting unit is not detected by the torque detecting unit error detecting unit, and configured to select the second torque command, when an error of the torque detecting unit is detected by the torque detecting unit error detecting unit;

a motor control unit configured to drive control the electric motor based on the torque command selected by the emergency switching unit;

a wheel rotation speed error detecting unit configured to detect an error of the wheel rotation speed based on at least one of the wheel rotation speed detected by the wheel rotation speed detecting unit, the steering torque detected when the steering torque detecting unit is normal, and the motor rotation information detected by the motor rotation information detecting unit; and an emergency command limiting unit configured to limit the second torque command when the second torque command is selected by the emergency switching unit, where the error of the wheel rotation speed is detected by the wheel rotation speed error detecting unit, wherein the second torque command calculating unit comprises a self-aligning torque estimating unit configured to estimate a self-aligning torque applied to the steering mechanism based on the wheel rotation speed, a gain adjusting unit configured to calculate the second torque command by multiplying gain with the self-aligning torque estimated by the self-aligning torque estimating unit, and a torque control unit configured to limit the second torque command calculated by the gain adjusting unit on the basis at least on either of a vehicle speed calculated based on the wheel rotation speed detected by the wheel rotation speed detecting unit or a vehicle speed detected by a vehicle speed detecting unit, and a motor angular velocity calculated by a motor angular velocity calculating unit, and where the error of the wheel rotation speed is detected when the second torque command is selected, the emergency command limiting unit limits the second torque command to a limiting value calculated as a function of a deviation between a threshold and a left and right wheel rotation speed difference detected by the wheel rotation speed detecting unit.

18. The electric power steering apparatus according to claim 8, wherein the gain adjusting unit determines whether in which steering states a vehicle is among a wheel over-turning sate, a wheel turning-back state, and a wheel holding state based on either of the vehicle speed calculated based on the motor rotation information detected by the motor rotation information detecting unit and the self-aligning torque estimated by the self-aligning torque estimating unit, and wherein the gain adjusting unit comprises at least one of a steering state gain adjusting unit configured to adjust steering state sensitive gain based on the determined result of the steering, a vehicle speed gain adjusting unit configured to adjust vehicle speed sensitive gain based on either of the vehicle speed calculated based on the wheel rotation speed detected by the wheel rotation speed detecting unit or the vehicle speed detected by the vehicle speed detecting unit, a self-aligning torque gain adjusting unit configured to adjust the self-aligning torque gain on the basis of a deviation between the motor rotation information detected by the motor rotation information detecting unit and the vehicle rotation speed detected by the wheel rotation speed detecting unit, and the self-aligning torque estimating value estimated by the self-aligning torque estimating unit, and a driving wheel slip gain adjusting unit configured to estimate a driving wheel slip state based on the wheel rotation speed detected by the wheel rotation speed detecting unit, and configured to adjust driving wheel slip sensitive gain based on the estimated driving wheel slip state.

19. The electric power steering apparatus according to claim 18, wherein when the second torque command is selected instead of the first torque command, the emergency switching unit gradually changes a command from the first torque command to the second torque command.

* * * * *